(12) United States Patent
Liu

(10) Patent No.: US 12,093,650 B2
(45) Date of Patent: Sep. 17, 2024

(54) WEBSITE ANALYZING METHOD

(71) Applicant: Jim Liu, Las Vegas, NV (US)

(72) Inventor: Jim Liu, Las Vegas, NV (US)

( * ) Notice: Subject to any disclaimer, the term of this patent is extended or adjusted under 35 U.S.C. 154(b) by 343 days.

(21) Appl. No.: 17/580,863

(22) Filed: Jan. 21, 2022

(65) Prior Publication Data

US 2023/0237267 A1 Jul. 27, 2023

(51) Int. Cl.
*G06F 40/289* (2020.01)
*G06F 16/951* (2019.01)
*G06F 16/955* (2019.01)
*G06F 16/958* (2019.01)
*G06F 40/134* (2020.01)
*G06F 40/279* (2020.01)

(52) U.S. Cl.
CPC .......... *G06F 40/289* (2020.01); *G06F 16/951* (2019.01); *G06F 16/9566* (2019.01); *G06F 16/958* (2019.01); *G06F 40/134* (2020.01); *G06F 40/279* (2020.01)

(58) Field of Classification Search
CPC .. G06F 16/951; G06F 16/958; G06F 16/9566; G06F 40/289; G06F 40/279; G06F 40/134
See application file for complete search history.

(56) References Cited

U.S. PATENT DOCUMENTS

| | | | |
|---|---|---|---|
| 2009/0150372 A1* | 6/2009 | Batista Reyes | G06F 16/951 707/999.005 |
| 2012/0246134 A1* | 9/2012 | Yu | G06F 16/957 709/224 |
| 2023/0237267 A1* | 7/2023 | Liu | G06F 40/279 704/9 |

\* cited by examiner

*Primary Examiner* — Samuel G Neway
(74) *Attorney, Agent, or Firm* — Rosenberg, Klein & Lee

(57) ABSTRACT

The present invention includes steps of loading a website project; counting a word count of keywords of the website project for obtaining a word sum of the website project; respectively counting a first anchor word count for each of the anchor types to obtain a first anchor word sum for each of the anchor types; respectively dividing each of the first anchor word sums of each of the anchor types by the word sum to obtain multiple first internal anchor type percentages of the multiple anchor types; loading multiple first default anchor type percentages; for each of the anchor types, when the first internal anchor type percentage is greater than or equal to the first default anchor type percentage, marking the first internal anchor type percentage, and displaying results to prevent over-modifying the keywords corresponding to the marked anchor type, thus keeping the website project from being blacklisted.

21 Claims, 21 Drawing Sheets

| 30-Days | 60-Days | 90-Days | 180-Days | | |
|---|---|---|---|---|---|
| # | ANCHOR TYPE | ANCHOR KEYWORD | USAGE | GRAPH |
| 1 | BRAND | Best Dancing Star | 2 | |
| 2 | URL | bestdancingstar.com | 4 | |
| 3 | MISC | visit the website to learn more | 1 | |

FIG.7A

| # | TYPE | BASE WORD | ANCHOR KEYWORD | WORD SCORE | PERCENT | NOTES | | USAGE(30/ALL) |
|---|------|-----------|----------------|------------|---------|-------|---|---------------|
| 1 | REL | acting | understudy | 99999 | 0% | | ✓ ←72 | 0/0 |
| 2 | REL | acting | audition | 16888 | 0% | | ✓ | 0/1 |
| 3 | REL | acting | performance | 557 | 0% | WARNING MAY BE TOO GENERAL; | ✓ | 0/0 |
| 4 | REL | acting | histrionic | 99999 | 0% | | ✓ | 0/0 |

FIG.11

{bettertruckseatsinbigdallas.com} - (United States) - {XC-SERIES ADVANCED} - Cycle 1 - Final Delivery:2021-11-28

{fruityberry.com} - (United States) - {S-SERIES ADVANCED} - Cycle 13 - Final Delivery:2021-11-29

{bestdancingstar.com} - (United Kingdom) - {TITAN X110}-Cycle 89 - Final Delivery:2121-12-06

{bestdancingstar.com} CRM Module Project Keywords Rankings

Health Score: -559;{Checked On:2021-11-14}

| KEYWORD | HEALTH | GOOGLE ISSUES | GOOGLE LOCAL ISSUES | ANCHOR USAGE ISSUES | COMPETITIVE ISSUES | PREDICTED TREND | 3 MONTH TREND | 2 MONTH TREND | 1 MONTH TREND | 3-MONTH NO RANKINGS | 2-MONTH NO RANKINGS | 1-MONTH NO RANKINGS | RANKINGS CHANGE |
|---|---|---|---|---|---|---|---|---|---|---|---|---|---|
| best online dance classes | -39 | 1 | 0 | 10 | 24 | Down | Mixed | Up | Up | N/A | N/A | N/A | N/A |
| online dance classes | -37 | 1 | 0 | 4 | 28 | Down | Mixed | Up | Up | N/A | N/A | N/A | N/A |
| dancing school in London | -35 | 1 | 1 | 10 | 20 | Down | Mixed | Up | Up | N/A | N/A | N/A | N/A |

FIG.14

WEBSITE ANALYZING METHOD

BACKGROUND OF THE INVENTION

1. Field of the Invention

The present invention relates to an analyzing method, more particularly a website analyzing method.

2. Description of the Related Art

As internet grows and develops, online search engines become the main navigation tools for average internet users to search for their respective desired content on millions of websites. When a keyword is entered through an online search engine, the online search engine's advanced artificial intelligence (AI) would create a list of search results closely relating to the keyword. The list of search result however is most often astronomical in length, and would be nearly impossible to be fully explored by the average user. The websites are ranked by the AI to appear in an optimized order according to the AI's black box website ranking algorithm, and as a result, most of the webpages far down the ranked list of search results are ignored by the average user.

In response to the AI's website ranking behavior, the term "search engine optimization (SEO)" is created. SEO refers to website modification tactics of website content creators to improve their website ranking and organic traffic popularity, hence placing their website closer to the top of the list of search results. Such tactics often include modifications of keywords on a website, and more particularly, modifications of different anchor types of keywords and different link types of keywords.

The keywords are key components inside of an anchor text. An anchor text is a visible and clickable text in a hyperlink. In modern internet browsers, an anchor text would often appear as underlined blue text. The anchor types of keywords are also known as types of anchor text, and the link types of keywords are also known as backlink types. Common types of anchor text include exact-match, partial-match, branded, etc. Exact-match type of anchor text has a keyword that mirrors a webpage being linked to. Partial-match type of anchor text has a variation of a keyword on the webpage being linked to. Branded type of anchor text has a brand name as an anchor text. A backlink is also known as an inbound link. An inbound link is a link for other websites to send outsider readers inbound to a person's website, wherein other websites are considered external as they share different domains to the person's website. Backlink types refer to what types of external webpages are viewing traffic coming from. Common backlinks include guest blogging backlinks, editorial backlinks, etc. Guest blogging backlinks direct viewing traffic from guest blogs, and editorial backlink direct view traffic from authoritative editorial webpages.

Rather than being fully disclosed, the SEO tactics are formulated unofficially and passively in response to the AI's ranking algorithm. In other words, the search engine's developers initially have little control over these unofficial SEO tactics exploiting flaws of the search engine. For example, some website modifiers would incorporate the SEO tactics of spamming keywords unrelated to the website's actual content in an attempt to boost up their views and hence increase their website popularity and ranking.

In response to these SEO tactics, the search engine AI adopted a categorization of website SEO tactics as either white hat or black hat. Black hat tactics are blacklisted for incorporating website contents with unrelated click-baits for the average internet users. In other words, keywords in black hat tactics are misrepresented so that websites that utilize black hat tactics have higher ranks in the list of search results, and that the average internet users are tricked into entering websites that use black hat tactics only to discover mismatched or poor quality content. As a result, a website that utilizes black hat tactics receives significantly lower rankings and is intentionally kept away from search results by the search engine AI.

White hat tactics, on the other hand, represent tactics with keywords matching rightful content. This way, the average internet users can successfully find their desired website content using the online search engine as originally designed.

While many currently existing SEO tools boost website rankings and popularity of a content developer's website, none is committed to prevent the content developer's website from being blacklisted as using black hat SEO tactics due to over-modifications. As such, most content developer's websites using the currently existing SEO tools fall into a predicament of gambling whether further modifying the website leads to an increase or a decrease in the website's ranks and popularity.

In conclusion, the currently existing SEO tools focus on boosting the website's rank and popularity without tracking word usages on the website and imposing boundaries to the word usages. As a result, the currently existing SEO tools may risk being categorized as adopting black hat SEO tactics due to over-modification of words on the website. Once categorized as using black hat SEO tactics, the website would undoubtedly lose rank and popularity.

SUMMARY OF THE INVENTION

The present invention provides a website analyzing method, allowing a website to be sufficiently analyzed and subsequently preventing the website's SEO tactics to be categorized as black hat tactics due to over-modifications.

The website analyzing method includes the following:
loading a website project; wherein the website project comprises multiple keywords, and each of the keywords belongs to one of multiple anchor types;
counting a word count of the keywords of the website project for obtaining a word sum of the website project;
respectively counting a first anchor word count for each of the anchor types to obtain a first anchor word sum for each of the anchor types;
respectively dividing each of the first anchor word sums of each of the anchor types by the word sum to obtain multiple first internal anchor type percentages of the multiple anchor types;
based on a selected strategy of multiple optimizing strategies, loading multiple first default anchor type percentages of the multiple anchor types of the selected strategy;
comparing the first internal anchor type percentages to the corresponding first default anchor type percentages;
for each of the anchor types, when the first internal anchor type percentage is greater than or equal to the first default anchor type percentage, marking the first internal anchor type percentage;
generating a first internal warning information corresponding to the marked first internal anchor type percentage;

displaying the first internal anchor type percentages of the multiple anchor types, the first default anchor type percentages of the multiple anchor types, and the first internal warning information.

In the present invention, the optimizing strategies are formulated and constantly adjusted to stay within white hat SEO category through trial and error experiments of many website projects. These trial and error experiments are conducted by incorporating a private understanding of Google's algorithms and knowledge of keywords and website ranking information gathered by using third party backlink analysis tools, such as Ahrefs.com.

The present invention analyzes the website project to track usage of the keywords in the website project as the internal anchor type percentages. The present invention imposes boundaries for using the keywords in the website project as the default anchor type percentages. More particularly, the present invention compares the internal anchor type percentages of the website project to the default anchor type percentages of the selected strategy, and displays results. The results notify a website modifier to caution risks of over-modifying the website project and being blacklisted as using black hat tactics. The present invention in essence creates a protection boundary for SEO tactics to remain white hat in terms of anchor type usage percentages in the website project. As a result, over-modification of the keywords is prevented. The present invention therefore prevents the website project from being blacklisted and better maintains the website project's rank and popularity.

BRIEF DESCRIPTION OF THE DRAWINGS

FIG. 7A is a perspective view of a keyword list of the website analyzing method of the present invention.

FIG. 11 is a perspective view of multiple variation keywords of the website analyzing method of the present invention.

FIG. 14 is a perspective view of health scores of website projects of the website analyzing method of the present invention.

DETAILED DESCRIPTION OF THE INVENTION

While in reality, paid websites and content will always be placed on top of lists of search results due to the commercial nature of search engines, the discussion here only concerns improving rankings of organic traffics going to a website, in other words, non-payment related ranking of the website.

Figure 1:
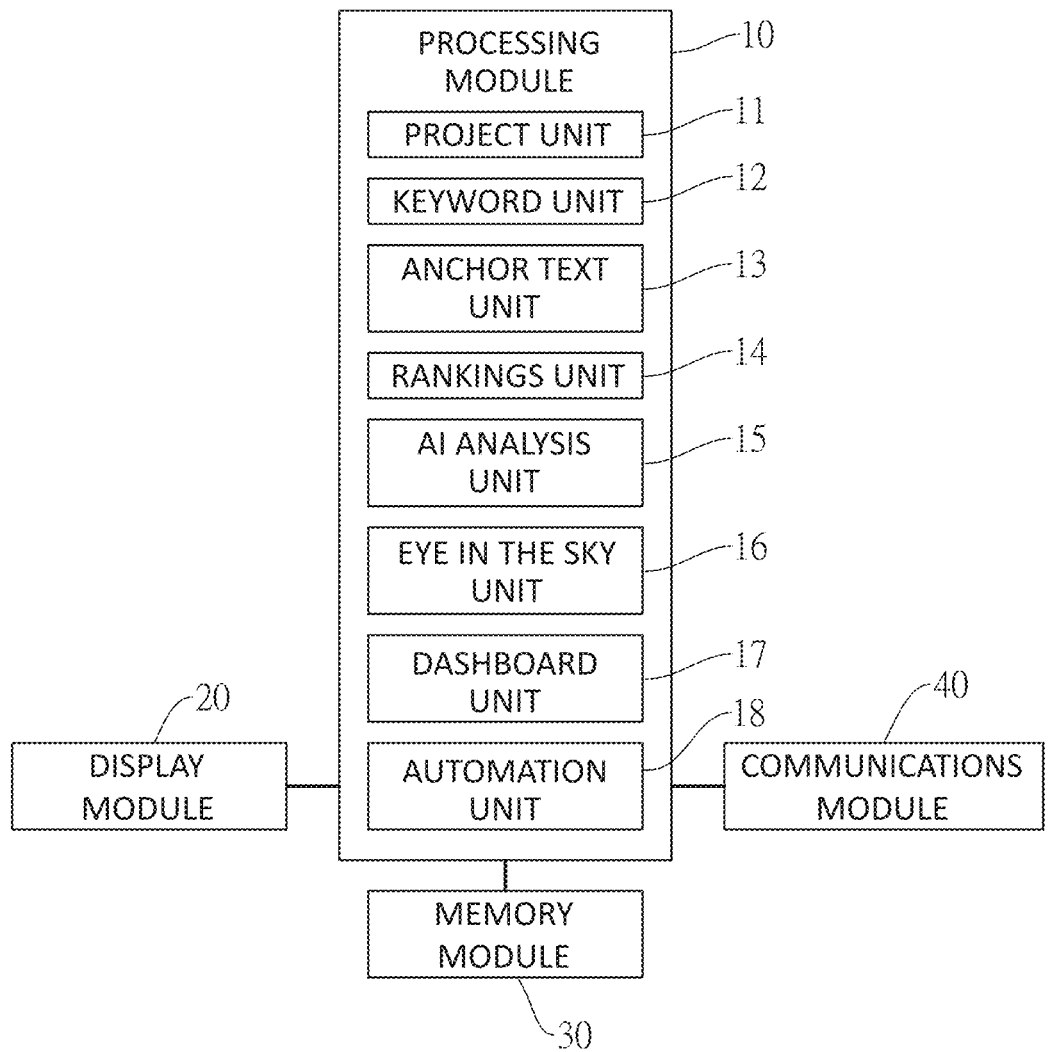
FIG. 1 is a block diagram of an operating system used for a website analyzing method of the present invention.

With reference to FIG. 1, the present invention provides a website analyzing method. The website analyzing method is executed by a processing module 10. The processing module 10 is respectively electrically connected to a display module 20, a memory module 30, and a communications module 40. The processing module 10 is able to connect to internet through the communications module 40, and furthermore the processing module 10 is able to reach third party tools and websites online through the communications module 40. The processing module 10 is able to access one of many website project files stored in the memory module 30, and execute the website analyzing method to conduct a website project file's analysis. The analyzed results are then displayed through the display module 20. The processing module 10 runs multiple software units working in combination for keeping the website project remaining white-hat. The software units comprises a project unit 11, a keyword unit 12, an anchor text unit 13, a rankings unit 14, an AI analysis unit 15, an Eye in the Sky unit 16, a dashboard unit 17, and an automation unit 18.

Figure 2:
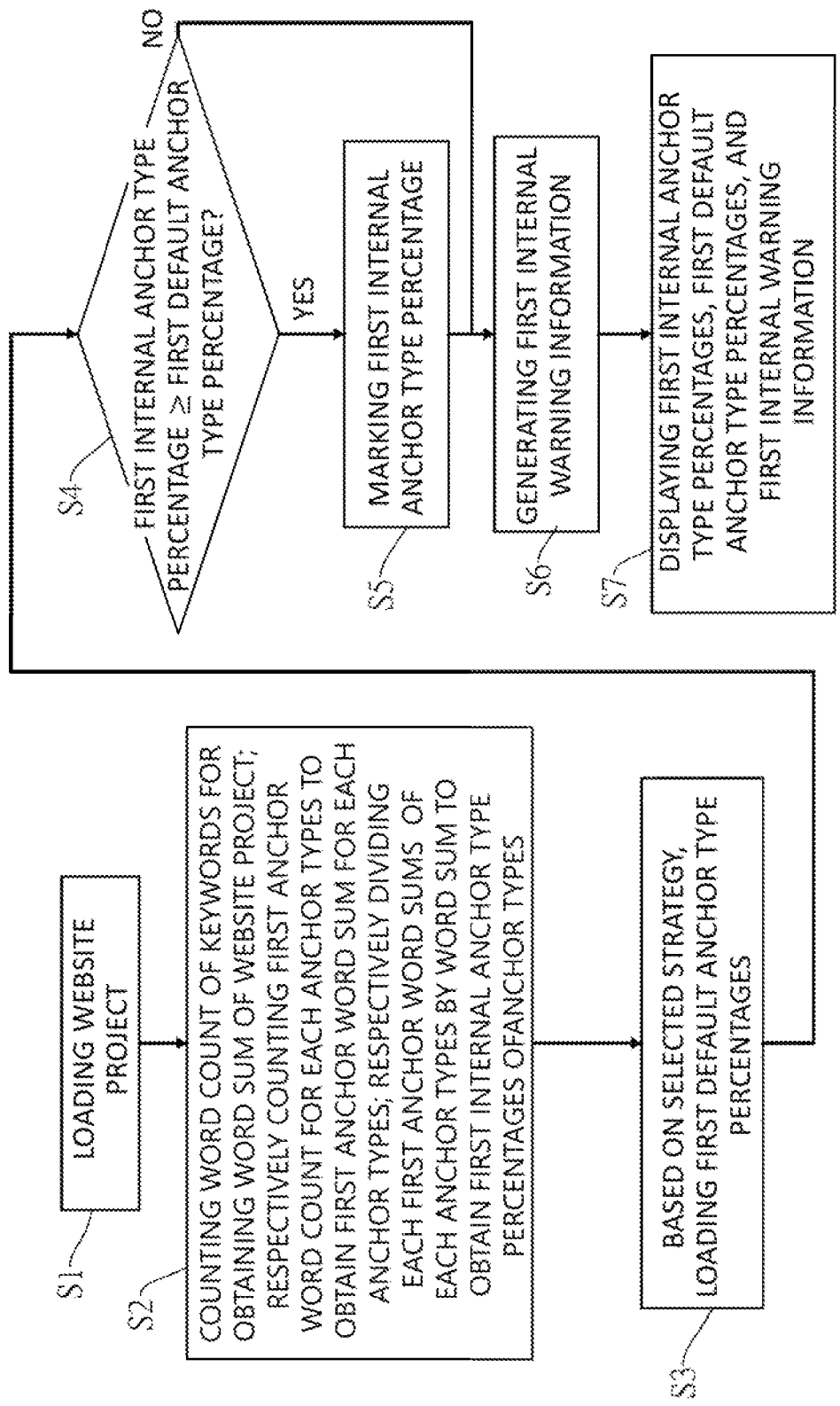
FIG. 2 is a flow chart for the website analyzing method of the present invention.

With reference to FIG. 2, the website analyzing method includes the following steps:

Step S1: loading a website project through the project unit 11. The website project comprises multiple keywords, and each of the keywords belongs to one of multiple anchor types.

Step S2: counting a word count of the keywords of the website project through the keyword unit 12 for obtaining a word sum of the website project; respectively counting a first anchor word count for each of the anchor types through the anchor text unit 13 to obtain a first anchor word sum for each of the anchor types; respectively dividing each of the first anchor word sums of each of the anchor types calculated through the anchor text unit 13 by the word sum calculated through the keyword unit 12 to obtain multiple first internal anchor type percentages of the multiple anchor types.

Step S3: based on a selected strategy of multiple optimizing strategies, loading multiple first default anchor type percentages through the project unit 11 as overmodification thresholds towards the first internal anchor type percentages; wherein each of the first default anchor type percentages corresponds to one of the multiple anchor types of the selected strategy.

Step S4: for each of the anchor types, comparing the first internal anchor type percentages to the first default anchor type percentages through the Eye in the Sky unit 16.

Step S5: for each of the anchor types, when the first internal anchor type percentage is greater than or equal to the first default anchor type percentage, marking the first internal anchor type percentage as being over-modified in regard to the selected strategy through the Eye in the Sky unit 16.

Step S6: generating a first internal warning information corresponding to the marked first internal anchor type percentage through the Eye in the Sky unit 16.

Step S7: displaying the first internal anchor type percentages of the multiple anchor types, the first default anchor type percentages of the multiple anchor types, and the first internal warning information by having the dashboard unit 17 to generate an interface and displaying the interface through the display module 20 for warning over-modification of the keywords of the website project in regard to the selected strategy.

The multiple optimizing strategies are saved in the memory module 30, and between step S2 and step S3, the processing module 10 displays the multiple optimizing strategies on the display module 20 as options to be selected. The multiple optimizing strategies are formulated and constantly adjusted to stay within white hat search engine optimization (SEO) category through trial and error experiments of many previous website projects. These trial and error experiments are conducted by incorporating a private understanding of a third party search engine's algorithms, such as Google's algorithms, and knowledge of keywords and website ranking information gathered by using third party backlink analysis tools, such as Ahrefs.com.

The multiple optimizing strategies differ by different degrees of aggressiveness in adopting SEO tactics for improving the website project's rank. For instance, a semi-balance optimizing strategy would try to balance the first default anchor type percentages of all the anchor types, so as to stay safely balanced and within the theoretical formulation of white hat boundaries. In contrast, a more aggressive optimizing strategy would try to tilt the balance of the first default anchor type percentages of certain anchor types in favor of a higher stake approach to edit the website project. The present invention allows adaptations of various degrees of aggressiveness in adopting SEO tactics, but more importantly, the present invention provides analytic means to first analyze the website project and then to enforce that the selected strategy is followed. This way the present invention provides a safety mechanism to prevent a website modifier from over-modifying the website project.

Step S4 compares the first internal anchor type percentages to the corresponding first default anchor type percentages by determining whether the first internal anchor type percentage of one of the anchor types is greater than or equal to the first default anchor type percentage of the corresponding one of the anchor types. Furthermore, to compare all of the anchor types, the determination is iterated for each of the anchor types until all of the anchor types are determined. For each iteration, when the first internal anchor type percentage is determined to be greater than or equal to the first default anchor type percentage, the processing module 10 executes step S5 and heads to a next iteration of step S4. For each iteration, when the first internal anchor type percentage is determined to be less than the first default anchor type percentage, the processing module 10 heads directly into a next iteration of step S4. After all of the anchor types are determined, if all of the iterations determine the first internal anchor type percentage is less than the first default anchor type percentage, then the processing module 10 executes step S6 and skips executing step S5.

When executing step S6, if the first internal anchor type percentage is yet to be marked, the first internal warning information would stay clear of having any actual warning to the website modifier. Thus when executing step S7, the first internal warning information would be displayed as blank on the display module 20. This way the present invention only alerts the website modifier when deemed necessary.

While all of the keywords have one of many anchor types, all of the keywords also have one of many link types. In an embodiment of the present invention, some of the keywords belong to a first link type, while some of the other keywords belong to a second link type. The multiple first internal anchor type percentages and the multiple first default anchor type percentages of the multiple anchor types mentioned above all correspond to the keywords that belong to the first link type. For the keywords in the website project that belong to the second link type, similar steps can be taken to analyze them as with the first internal anchor type percentages from step S2 to S6.

For the keywords that belong to the second link type, the processing module 10 further executes steps of:

Step S2': respectively counting a second anchor word count for each of the anchor types that corresponds to the second link type through the anchor text unit 13 to obtain a second anchor word sum for each of the anchor types; and respectively dividing each of the second anchor word sums of each of the anchor types calculated through the anchor text unit 13 by the word sum calculated through the keyword unit 12 to obtain multiple second internal anchor type percentages of the multiple anchor types.

Step S3': loading multiple second default anchor type percentages through the project unit 11 as over-modification thresholds towards the second internal anchor type percentages of the multiple anchor types, the selected strategy and the second link type. The second default anchor type percentages belong to same link type as the multiple second internal anchor type percentages.

Step S4': for each of the anchor types, comparing the second internal anchor type percentages to the second default anchor type percentages through the Eye in the Sky unit 16.

Step S5': for each of the anchor types, when the second internal anchor type percentage is greater than or equal to the second default anchor type percentage, marking the second internal anchor type percentage as being over-modified in regard to the selected strategy through the Eye in the Sky unit 16.

Step S6': generating a second internal warning information corresponding to the marked second internal anchor type percentage through the Eye in the Sky unit 16.

These above steps S2' to S6' are similar to steps S2 to S6, except instead of the multiple first internal anchor type percentages, here the multiple first internal anchor type percentages are replaced by the multiple second internal anchor type percentages. Similarly, the multiple first default anchor type percentages are replaced by the multiple second default anchor type percentages, and the first internal warning information is replaced by the second internal warning information.

In the present embodiment, these link types include an overall link type, a mixed link type, a commenting link type, a directory link type, a citation link type, a high public relations (PR)/profile/education and government link type, a blog 2.0/document link type, a photo/video/infographic sharing link type, a social bookmark link type, a press release link type, an article anchor/guest posts link type, a social signal link type, an article topic link type, a map link type, a Wikipedia/classified/forum link type, and a custom link type. In another embodiment, the link types are free to be elsewhere. Information about these different link types, in the present invention, is embodied in different percentages of the first internal anchor type percentages and the second internal anchor type percentages. In other embodiments of the present invention, more anchor type percentages can be defined for representing more of the link types. For instance, if the first internal anchor type percentages correspond to the overall link type, the second internal anchor type percentages correspond to the directory link type, a third internal anchor type percentages can represent the custom link type.

Figure 3:
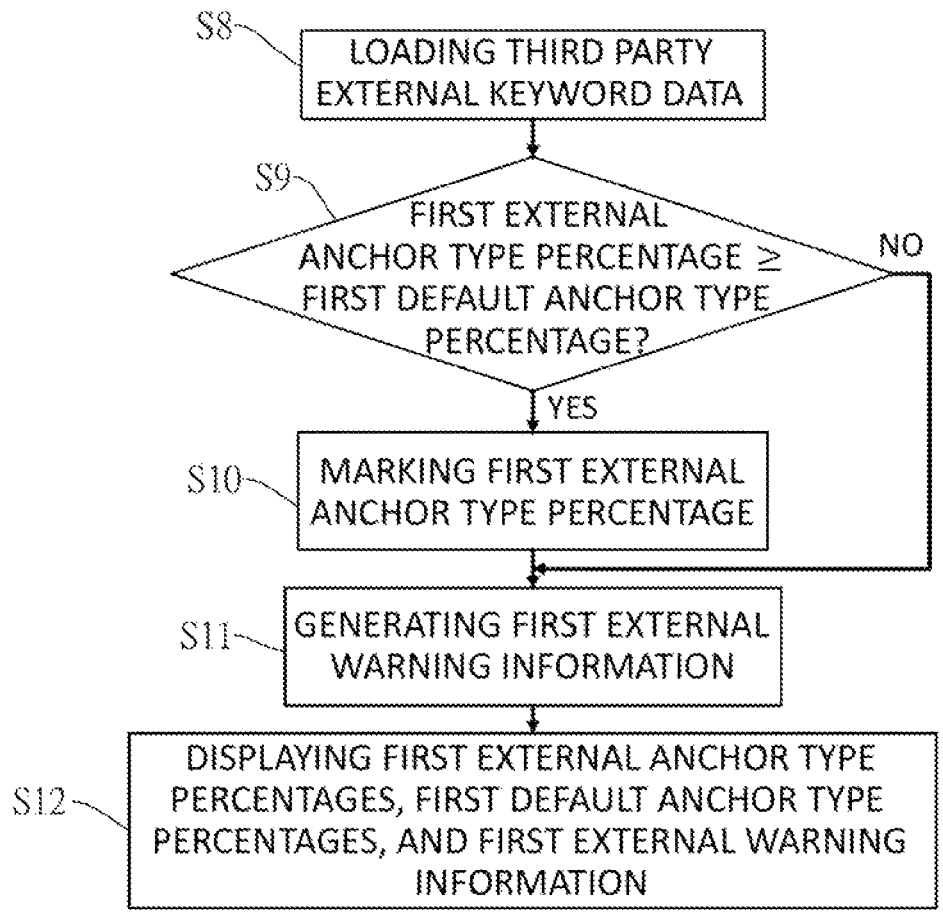
FIG. 3 is another flow chart for the website analyzing method of the present invention.
Figure 4:
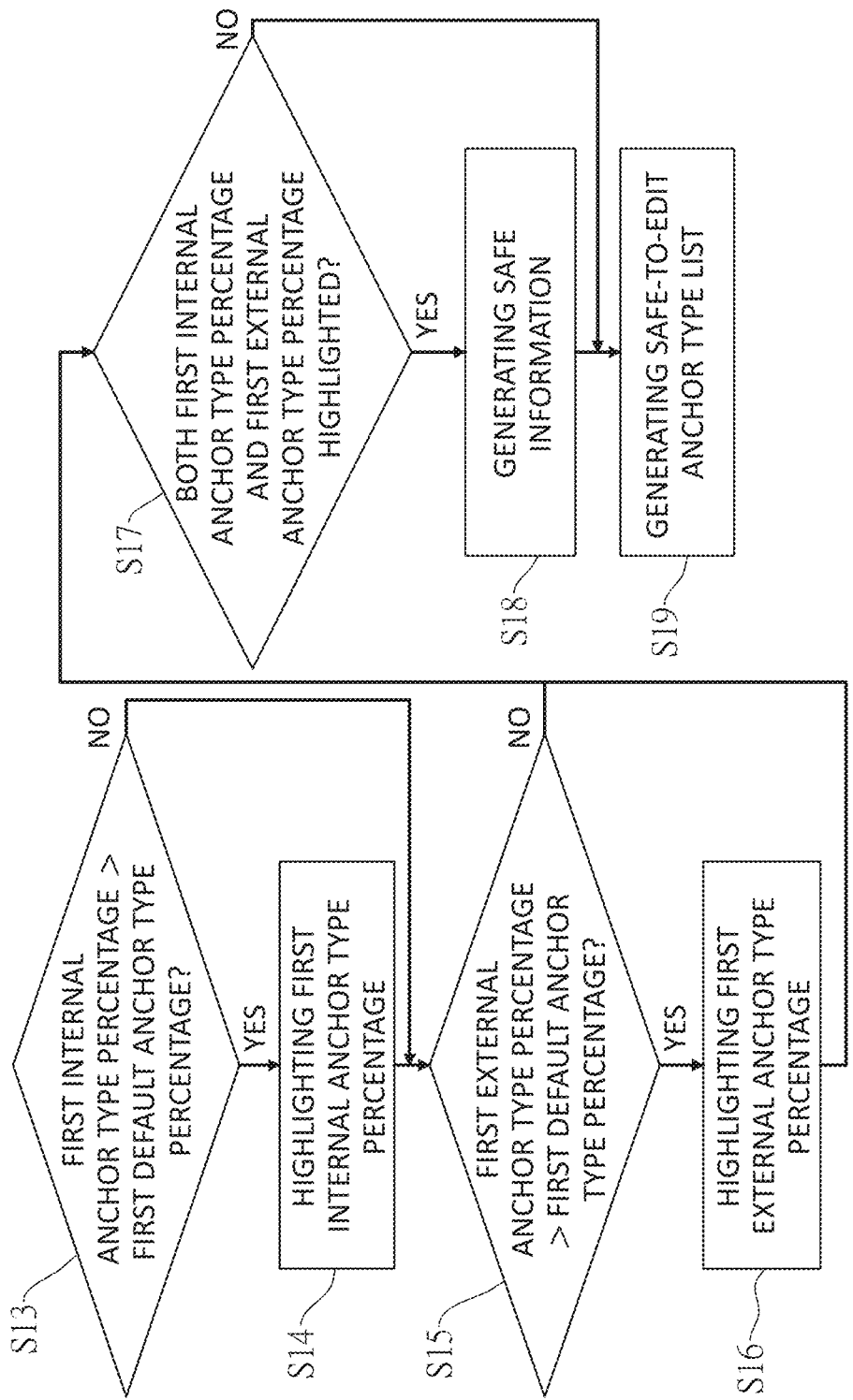
FIG. 4 is another flow chart for the website analyzing method of the present invention.

With reference to FIG. 3, the present invention additionally includes:

Step S8: loading third party external keyword data from the Internet through the keyword unit 12 and the anchor text unit 13 via the communications module 40. The third party external keyword data includes same keywords as the keywords of the website project, and the third party external keyword data comprises multiple first external anchor type percentages of the multiple anchor types.

Step S9: for each of the anchor types, comparing the first external anchor type percentages to the first default anchor type percentages through the Eye in the Sky unit 16.

Step S10: for each of the anchor types, when the first external anchor type percentage is greater than or equal to the first default anchor type percentage, marking the first external anchor type percentage as being over-modified in regard to the selected strategy through the Eye in the Sky unit 16.

Step S11: generating a first external warning information corresponding to the marked first external anchor type percentage through the Eye in the Sky unit 16.

Step S12: displaying the first external anchor type percentages of the multiple anchor types, the first default anchor type percentages of the multiple anchor types, and the first external warning information by having the dashboard unit 17 to generate and display another interface through the display module 20 for warning the over-modification of the anchor types of the keywords of the website project in regard to the selected strategy and the third party external keyword data.

Step S9 to S12 are similar to steps S4 to S7 as instead of comparing the first internal anchor type percentages to the corresponding first default anchor type percentages, and step S9 compares the first external anchor type percentages to the corresponding first default anchor type percentages. Similarly, instead of marking the first internal anchor type percentage, in step S10 the first external anchor type percentage is marked. Instead of generating and displaying the first internal warning information, in steps S11 and S12 the first external warning information is respectively generated and displayed.

Furthermore, the present embodiment includes the following steps:

Step S13: determining whether the first internal anchor type percentage of one of the anchor types is greater than the first default anchor type percentage of the corresponding one of the anchor types.

Step S14: for each of the anchor types, when the first internal anchor type percentage is greater than the first default anchor type percentage, highlighting the first internal anchor type percentage through the Eye in the Sky unit 16.

Step S15: determining whether the first external anchor type percentage of one of the anchor types is greater than the first default anchor type percentage of the corresponding one of the anchor types.

Step S16: for each of the anchor types, when the first external anchor type percentage is greater than the first default anchor type percentage, highlighting the first external anchor type percentage through the Eye in the Sky unit 16.

Step S17: determining whether both the first internal anchor type percentage and the first external anchor type percentage are yet to be highlighted.

Step S18: for each of the anchor types, when both the first internal anchor type percentage and the first external anchor type percentage are yet to be highlighted, generating safe information through the Eye in the Sky unit 16.

Step S19: based on the safe information of all of the anchor types, generating a safe-to-edit anchor type list including the anchor types corresponding to the safe information through the Eye in the Sky unit 16, for listing out anchor types safe to be further modified while remaining white-hat.

When the first internal anchor type percentage is less than and equal to the first default anchor type percentage, then the processing module 10 skips S14 and executes S15 instead. When the first external anchor type percentage is less than and equal to the first default anchor type percentage, then the processing module 10 skips S16 and executes S17 instead. When determining either the first internal anchor type percentage or the first external anchor type percentage is highlighted, the processing module 10 skips S18 and executes S19 instead. In this case the safe information would remain empty, while the first internal warning information or the first external warning information would have content of recommendation for the website modifier. The safe-to-edit anchor type list, as the name suggests, lists out anchor types safe to be edited by the website modifier without exceeding the formulated white hat boundary and risk being categorized as using black hat SEO tactics.

Figure 5A:
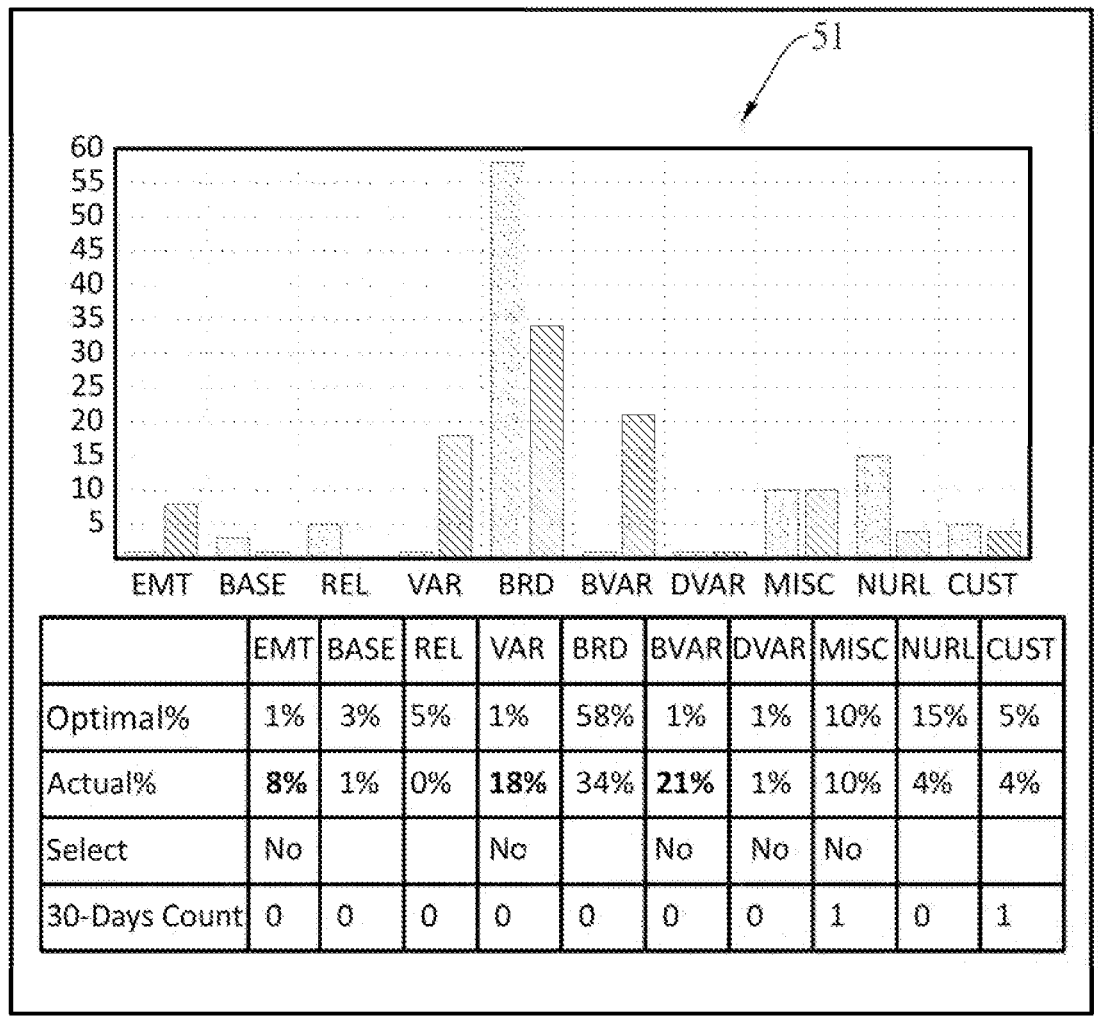
FIG. 5A is a perspective view of first internal anchor type percentages of the website analyzing method of the present invention.
Figure 5B:
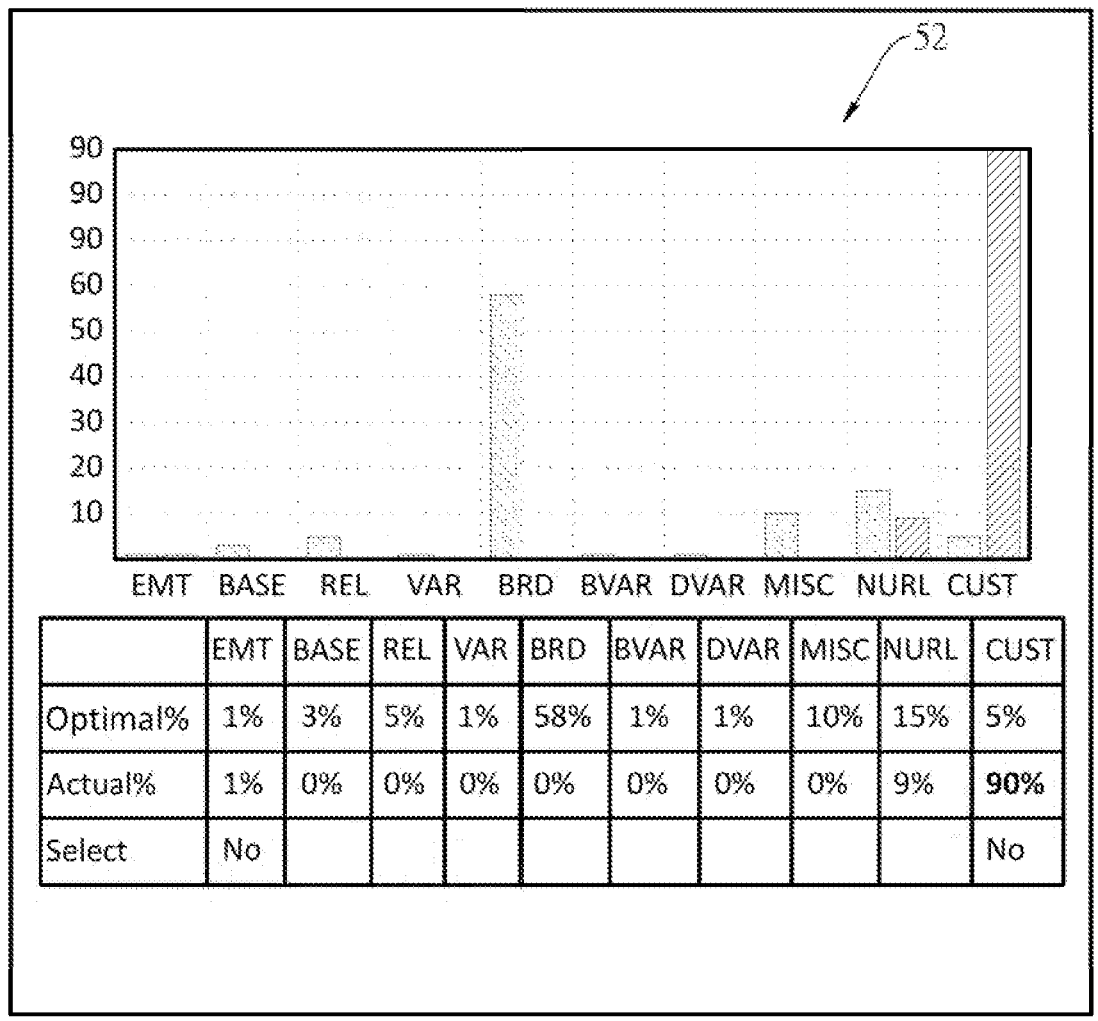
FIG. 5B is a perspective view of the first external anchor type percentages of the website analyzing method of the present invention.

With reference to FIGS. 5A and 5B: FIG. 5A represents an internal anchor percentage comparison interface that is generated by the processing module 10 and displayed through the display module 20. The internal anchor percentage comparison interface shows the comparison of the first internal anchor type percentages, represented as "Actual %", to the first default anchor type percentages, represented as "Optimal %". The anchor types are, for instance, categorized as EMT, BASE, REL, VAR, BRD, BVAR, DVAR, MISC, NURL, and CUST. The EMT stands for exactly matched text, the BASE stands for base text, the REL stands for related text, the VAR stands for variation text, the BRD stands for branded text, the BVAR stands for branded variation text, the DVAR stands for domain variation text, the MISC stands for miscellaneous text, the NURL stands for natural link text, and the CUST stands for custom text. In other embodiments, the anchor types used and defined for the present invention are free to be elsewhere.

In the present embodiment, the marked first internal anchor type percentage is represented as having "No" marked in the "Select" row, and the highlighted first internal anchor type percentage is represented in bold font. In other words, in FIG. 5A, for the EMT anchor type, since 8% of actual percentage is greater than 1% of optimal percentage, the EMT anchor type is marked as "No" select option for the website modifier, and the 8% font is highlighted in bold font. On the other hand, for the DVAR anchor type, since 1% of actual percentage is equal to 1% of optimal percentage, the EMT anchor type is marked as "No" select option for the website modifier, but the 1% font is sparred from being highlighted in bold font. The present invention therefore makes some analytical distinction for the website modifier through the display module 20. Additionally, all of the percentages are also presented in bar graphs 51, 52. In bar graph 51, the first internal anchor type percentages are represented as bars with striped lines, and the first default anchor type percentages are represented as bars with dots.

FIG. 5B represents an external anchor percentage comparison interface that is generated by the processing module 10 and displayed through the display module 20. The external anchor percentage comparison interface shows the comparison of the first external anchor type percentages, represented as "Actual %" in FIG. 5B, to the first default anchor type percentages, represented as "Optimal %" in FIG. 5B. With all features similar to FIG. 5A, here in bar graph 52, the first default anchor type percentages are represented as bars with striped lines, and the first default anchor type percentages are represented as bars with dots.

Furthermore, when obtaining the first internal anchor type percentages, a time stamp is generated for each of the keywords using a current time information of an operating system by the keyword unit 12 that is executing the present invention. In the present invention, such operating system is the processing module 10 executing the present invention.

In another embodiment of the present invention, instead of bar graphs 51, 52, the first internal anchor type percentages and the first default anchor type percentages may be represented in a pie chart. Since the first internal anchor type percentages and the first default anchor type percentages all belong to a same link type, the pie chart is perfect for representing detail compositions of the first internal anchor type percentages and the first default anchor type percentages respectively in different anchor types.

Figure 6:
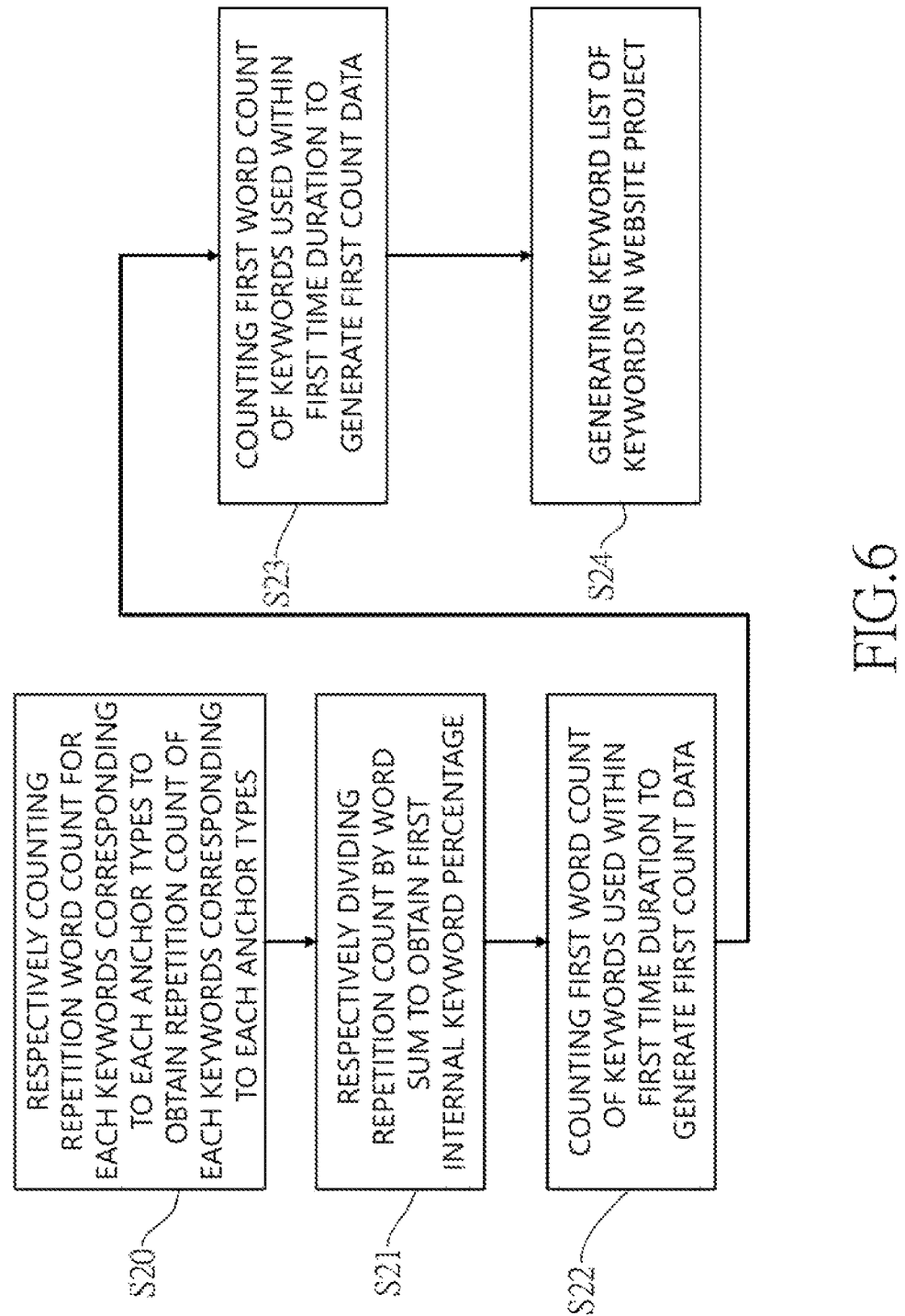
FIG. 6 is another flow chart for the website analyzing method of the present invention.

With reference to FIG. 6, the processing module 10 further executes steps of:
  Step S20: respectively counting a repetition word count for each of the keywords corresponding to each of the anchor types through the keyword unit 12 in order to obtain a repetition count of each of the keywords corresponding to each of the anchor types, thus finding how many times each of the keywords is repeatedly used in each of the anchor types.
  Step S21: respectively dividing the repetition count of each of the keywords corresponding to each of the anchor types by the word sum to obtain a first internal keyword percentage for each of the keywords corresponding to each of the anchor types through the keyword unit 12.
  Step S22: counting a first word count of the keywords used within a first time duration to generate a first count data through the keyword unit 12.
  Step S23: conducting a second word count of the keywords used within a second time duration to generate a second count data through the keyword unit 12, and displaying the second count data on an interface generated by the keyword unit 12 through the display module 20.
  Step S24: generating a keyword list of the keywords in the website project through the keyword unit 12, and displaying the keyword list on an interface generated by the keyword unit 12 through the display module 20.

The keyword list comprises the keywords, an anchor type of each of the keywords, the first internal keyword percentages, the time stamp of each of the keywords, and the repetition count of each of the keywords within the website project. The first time duration is shorter than the second time duration, and both the first time duration and the second time duration are time information stored within the memory module 30. In this embodiment, the first time duration is a time length of 30 days, and the second time duration is a time length of 60 days. In similar logic, the present embodiment also includes a third time duration for a time length of 90 days, and a fourth time duration for a time length of 180 days.

In FIG. 5A, the first count data is displayed under the "30-Days Count" row, as in FIG. 5A, the keywords under the MISC anchor type and the CUST anchor type have been used once each within the first time duration.

Figure 7B:
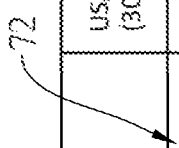
FIG. 7B is another perspective view of the keyword list of the website analyzing method of the present invention.
Figure 7C:
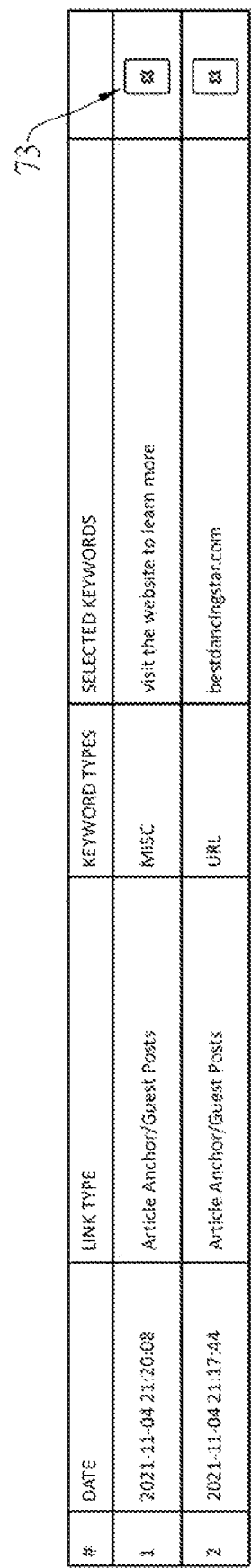
FIG. 7C is another perspective view of the keyword list of the website analyzing method of the present invention.

With reference to FIGS. 7A to 7C, the keyword list is displayed through the display module 20. FIG. 7A shows a keyword usage interface that is generated by the processing module 10 and displayed through the display module 20. The keyword usage interface shows that three of the keywords are used within the fourth time duration. The keywords here are listed along with their corresponding anchor types, the times used within the fourth time duration, and simple bar graphs 71 visualizing the times used within the fourth time duration.

FIG. 7B shows a keyword selection interface that is generated by the dashboard unit 17 of the processing module 10 and displayed through the display module 20. The keyword selection interface shows the first internal keyword percentage of a few of the keywords. Multiple selection buttons 72 are presented, as well as the first count data and the second count data. In FIG. 7B's case, the second time duration is set to be as long as the present invention has ever existed, and so the second time duration is represented as "ALL", while the first time duration, being the time length of 30 days, is represented as "30". In this case, the second word count corresponding to the second time duration represents how many times the keyword has ever appeared in the website project. Therefore, in FIG. 7B's case, both of the keywords displayed are yet to be ever used. The representation of "0/0" means "the first count data/the second count data".

If at least one of the selection buttons 72 is pressed for the at least one keyword, the at least one keyword is selected. The selection buttons 72 are pressed and selected through generic computer means, such as through the use of a mouse of a computer that has the processing module 10. FIG. 7C shows a selected keyword interface that is generated by the processing module 10 and displayed through the display module 20. The selected keyword interface shows a case wherein two keywords are selected. The time stamp of the two selected keywords are shown, as well as cancel buttons 73 for selection cancellations.

Figure 8A:
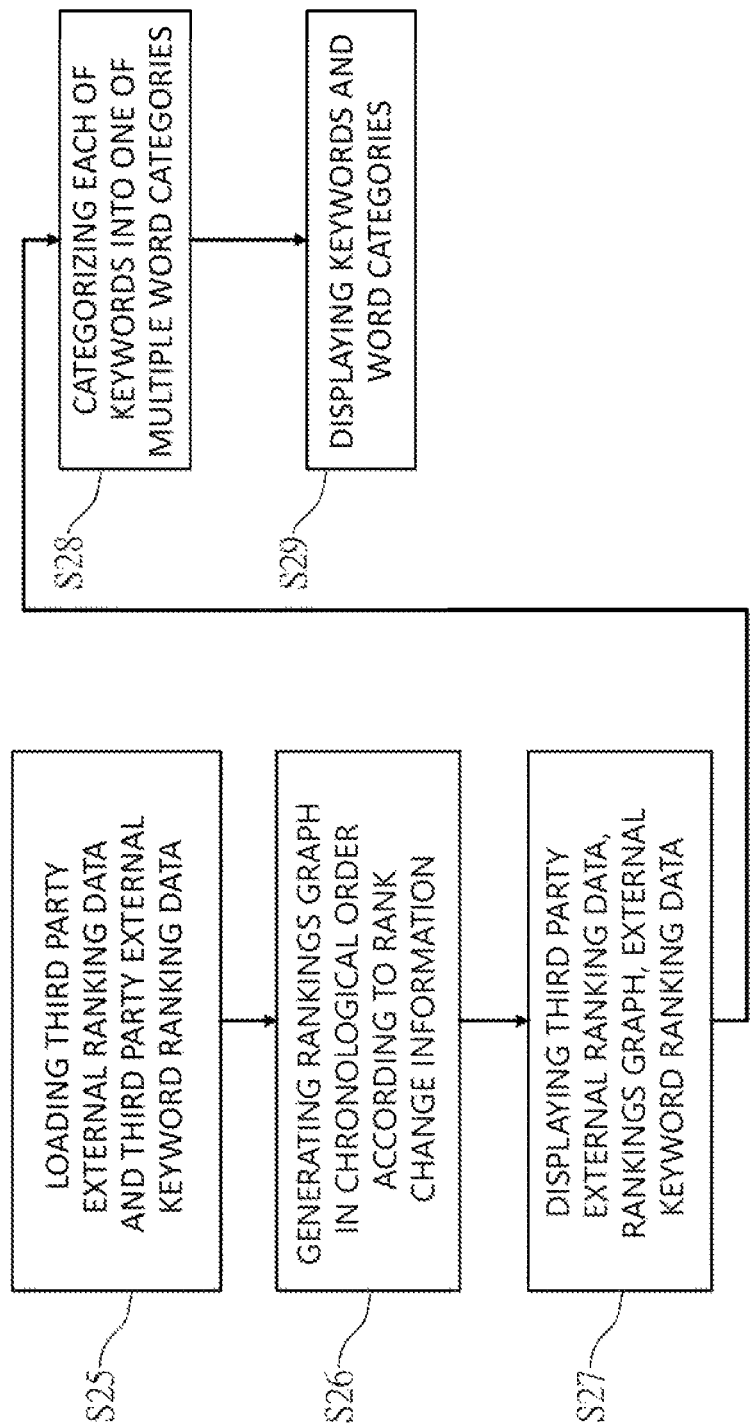
FIG. 8A is another flow chart for the website analyzing method of the present invention.

With reference to FIG. 8A, the present embodiment further includes the following steps:
  Step S25: loading third party external ranking data and third party external keyword ranking data from the Internet through the rankings unit 14 via the communications module 40. The third party external ranking data comprises at least one ranked Uniform Resource Locator (URL), a ranking third party search engine information, a time stamp for each of the at least one URL, and a rank change information for each of the at least one URL. The external keyword ranking data has keyword rank change information corresponding to the third party external keyword data.

Step S26: generating a rankings graph in chronological order according to the rank change information through the rankings unit 14.

Step S27: displaying the third party external ranking data, the rankings graph, and the external keyword ranking data along with the third party external keyword data by the dashboard unit 17 through the display module 20 for showcasing the rank change information of the at least one URL and showing how the keywords of the website project are ranked.

Step S28: categorizing each of the keywords into one of multiple word categories through the AI analysis unit 15. The categorization is aided by a language artificial intelligence (AI) of the AI analysis unit 15 trained for processing natural languages and phrases.

Step S29: displaying the keywords and the word categories by an interface generated by the dashboard unit 17 through the display module 20.

The aforementioned first internal warning information is displayed in sentences formulated by the language AI, for recommending to the website modifier to omit further editing the anchor type corresponding to the first internal warning information. In FIG. 7B, the bold text "INSUFFICIENT BRANDING;" is also generated by the language AI for notifying the website modifier of a situation of the corresponding keyword lacking in the BRD anchor type category.

Figure 8B:
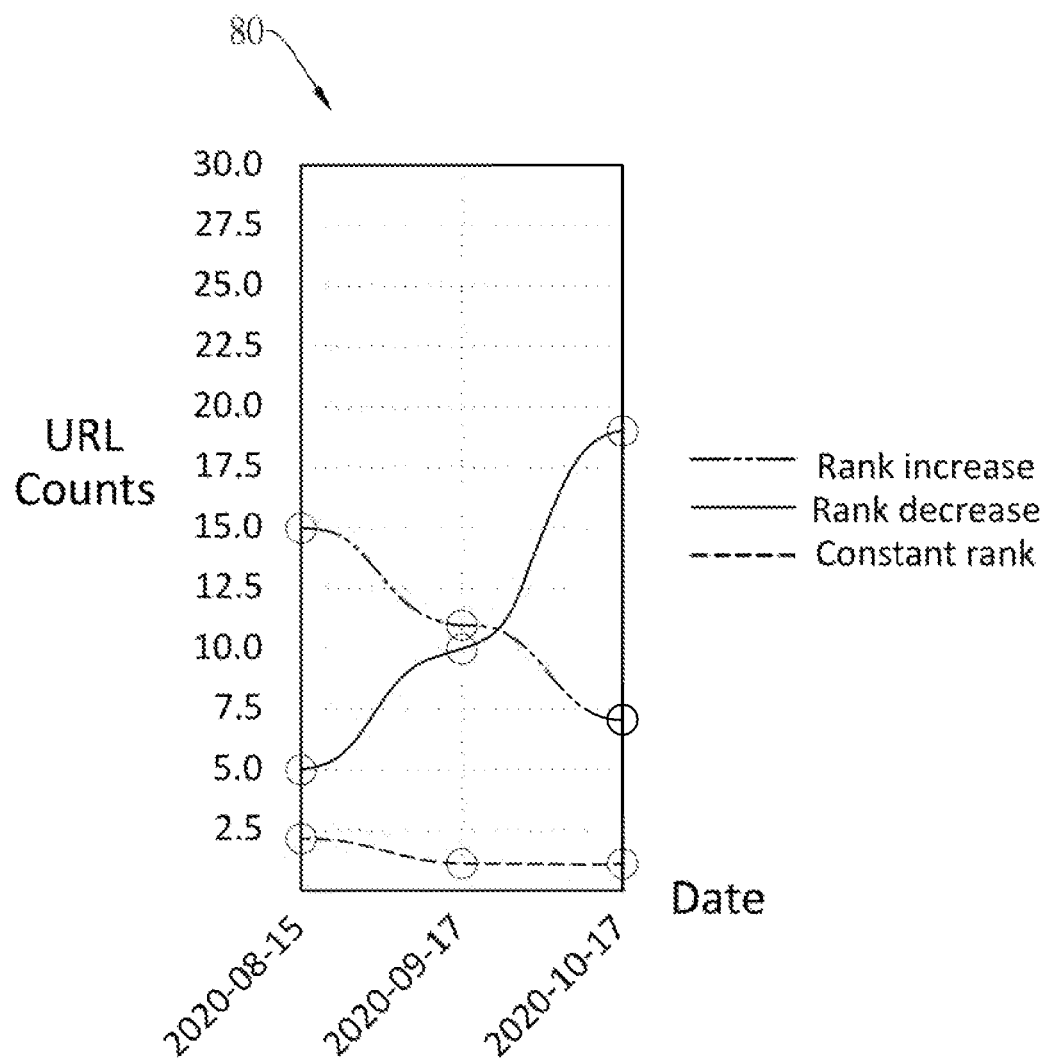
FIG. 8B is a rankings graph of the website analyzing method of the present invention.

With reference to FIG. 8B, a rankings graph 80 is generated by the processing module 10 and displayed through the display module 20. The rankings graph 80 uses three types of patterns to showcase the rank change information of the at least one URL in chronological order. At each given time, respective counts of the at least one URL with rank increase, rank decrease, or constant rank can be seen through the three patterns. More particularly, here in the rankings graph 80 a dashdotted line represents the at least one URL with rank increase, a solid line represents the at least one URL with rank decrease, and a dashed line represents the at least one URL with constant rank. In other embodiments, the rankings graph 80 is free to be elsewise, as the rankings graph 80 may use three patterns to chronologically display respective counts of the keywords are ranked. At each given time, respective counts of the keywords newly ranked, unranked, or staying ranked can be seen through the three patterns.

Figure 9:
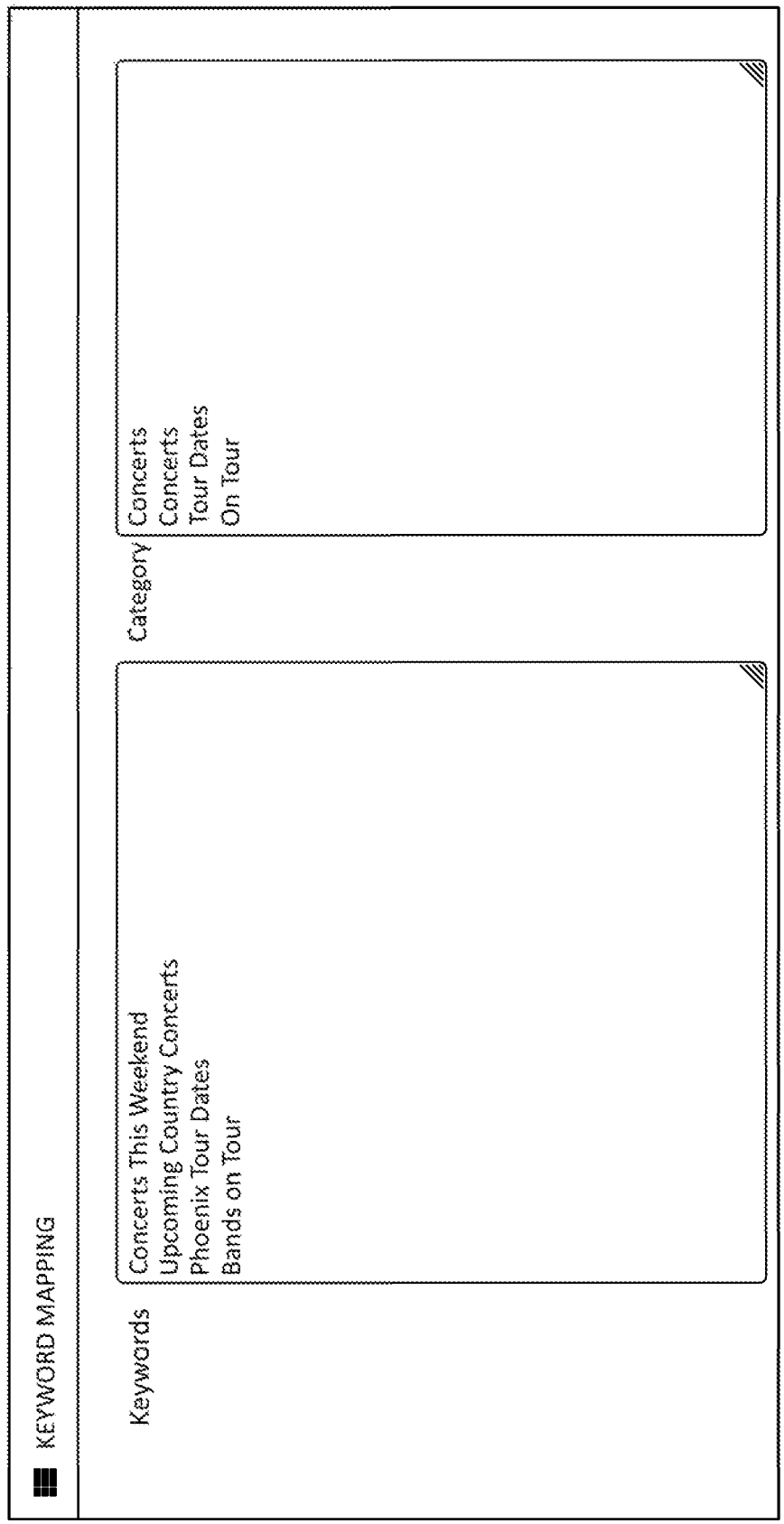
FIG. 9 is a perspective view of word categories of the website analyzing method of the present invention.

With reference to FIG. 9, FIG. 9 shows a keyword mapping interface. The keyword mapping interface is generated by the processing module 10 and displayed through the display module 20. The keyword mapping interface shows the keywords and the word categories. The language AI, for instance, deduces that for the keywords such as "Concerts This Weekend", the most important information within that needs to be categorized as one of the word categories is "Concerts". The language AI further deduces that "Phoenix Tour Dates" can be categorized under one of the word categories as "Tour Dates", and "Bands on Tour" categorized under one of the word categories as "On Tour". With the help of the language AI, the present invention is able to better handle the keywords with trained deep learning neural network structures.

Figure 10:
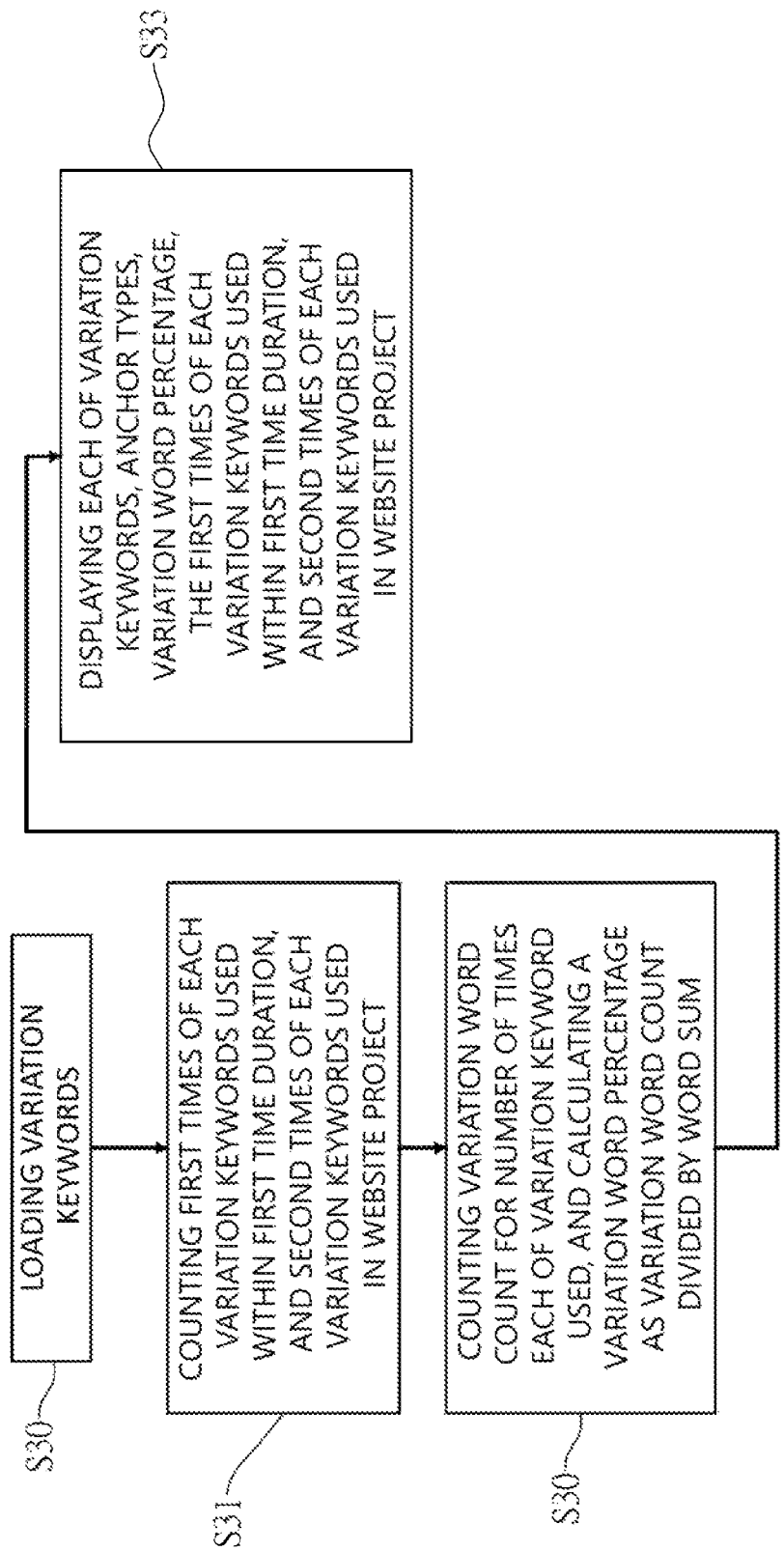
FIG. 10 is another flow chart for the website analyzing method of the present invention.

With reference to FIG. 10, the present invention further includes steps of:

Step S30: based on a selected keyword out of the keywords, loading multiple variation keywords relating to the selected keyword from a third party tool.

Step S31: counting first times of each of the variation keywords used within the first time duration through the keyword unit 12, and second times of each of the variation keywords used in the website project through the keyword unit 12.

Step S32: for each of the variation keywords, counting a variation word count for the number of times of each of the variation keywords appearing in the website project through the keyword unit 12, and calculating a variation word percentage as the variation word count divided by the word sum through the keyword unit 12.

Step S33: displaying each of the variation keywords, the anchor types of each of the variation keywords, the variation word percentage of each of the variation keywords, the first times of each of the variation keywords used within the first time duration, and the second times of each of the variation keywords used in the website project on an interface generated by the dashboard unit 17 through the display module 20.

With reference to FIG. 11, FIG. 11 shows a variation keyword interface. The variation keyword interface is generated by the dashboard unit 17 of the processing module 10 and displayed through the display module 20. The variation keyword interface shows the multiple variation keywords. In this case, the variation word percentages for all the variation keywords shown are 0%, and one of the variation keywords, "audition", is ever used once.

For each of the variation keywords, the language AI further creates a word score based on popularity of each of the variation keywords. The higher the word score is, the better rank the variation keyword has, and vice versa. When the word score for any of the variation keywords is determined by the Eye in the Sky unit 16 to be lower than a first word score threshold, a warning information is generated by the language AI. When displaying the variation keywords on an interface generated by the dashboard unit 17, the processing module 10 controls the display module 20 to further display the anchor type of each of the variation keywords, the word score of each of the variation keywords, and the warning information, thus showing an assessment of the variation keywords.

In the present embodiment, the first word score threshold is set to be 1000. Since one of the variation keywords, "performance", has word score of 557, the language AI generates and displays the warning information as "WARNING MAY BE TOO GENERAL;" to the website modifier.

Figure 12:
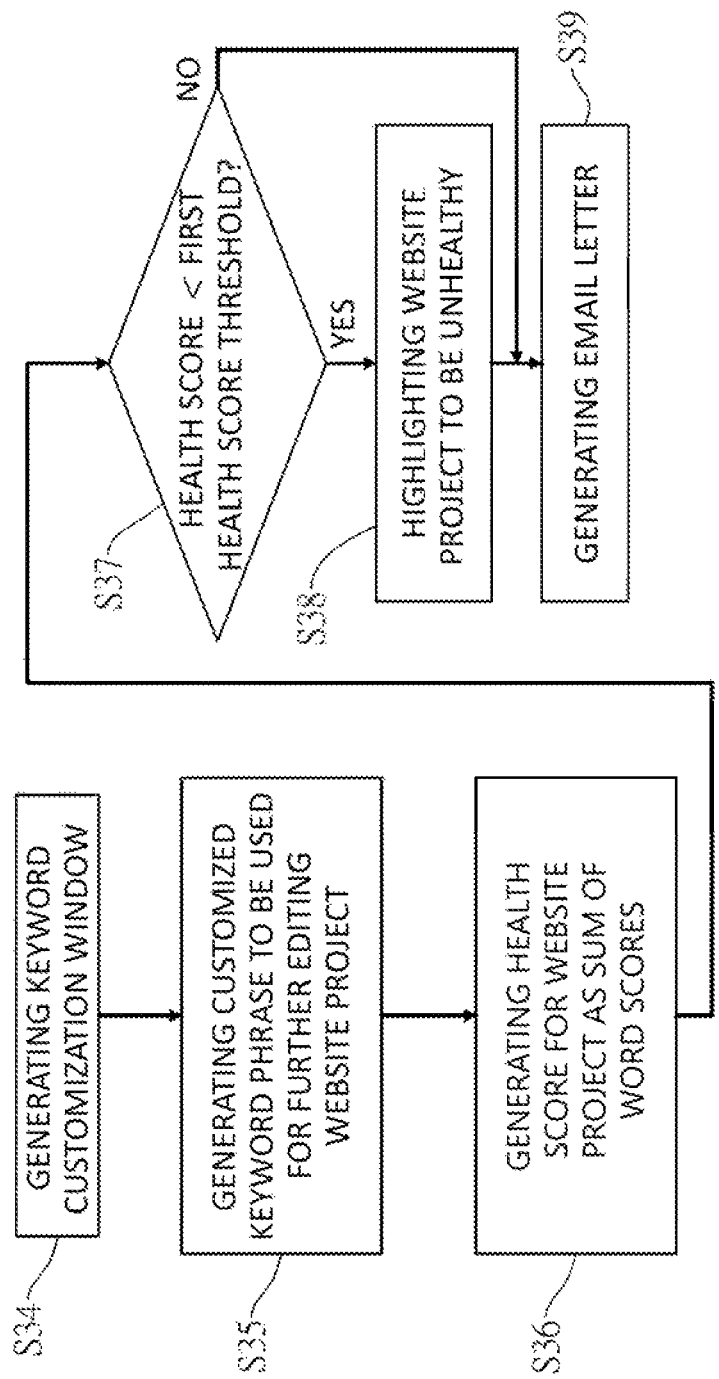
FIG. 12 is another flow chart for the website analyzing method of the present invention.

With reference to FIG. 12, the present invention further includes steps of:

Step S34: generating a keyword customization window by the dashboard unit 17. The keyword customization window displays the variation keywords above the first word score threshold and is yet to be used in the first time duration through the display module 20.

Step S35: after at least one of the variation keywords is selected, further generating a customized keyword phrase as an optimized keyword considered by the automation unit 18, allowing the customized keyword phrase to be used for further editing the website project while the website project remains white-hat.

Step S36: generating a health score for the website project as a sum of the word scores of the keywords by the Eye in the Sky unit 16. In other words, the present invention determines a word score for each of the keywords of the website project before summing these word scores to be the health score for the website project.

Step S37: determining whether the health score is less than a first health score threshold by the Eye in the Sky unit 16.

Step S38: when the health score is determined to be less than the first health score threshold by the Eye in the Sky unit 16, highlighting the website project to be unhealthy on an interface that is generated by the dashboard unit 17 and displayed through the display module 20, allowing a healthiness of the website project to remain white-hat to be clearly perceived via the display module 20.

Step S39: generating an email for the website project considered to be unhealthy through the Eye in the Sky unit 16 and the language AI of the AI analysis unit 15. The email lists out the keywords with the lowest word score contributing to the unhealthiness of the website project.

Figure 13:
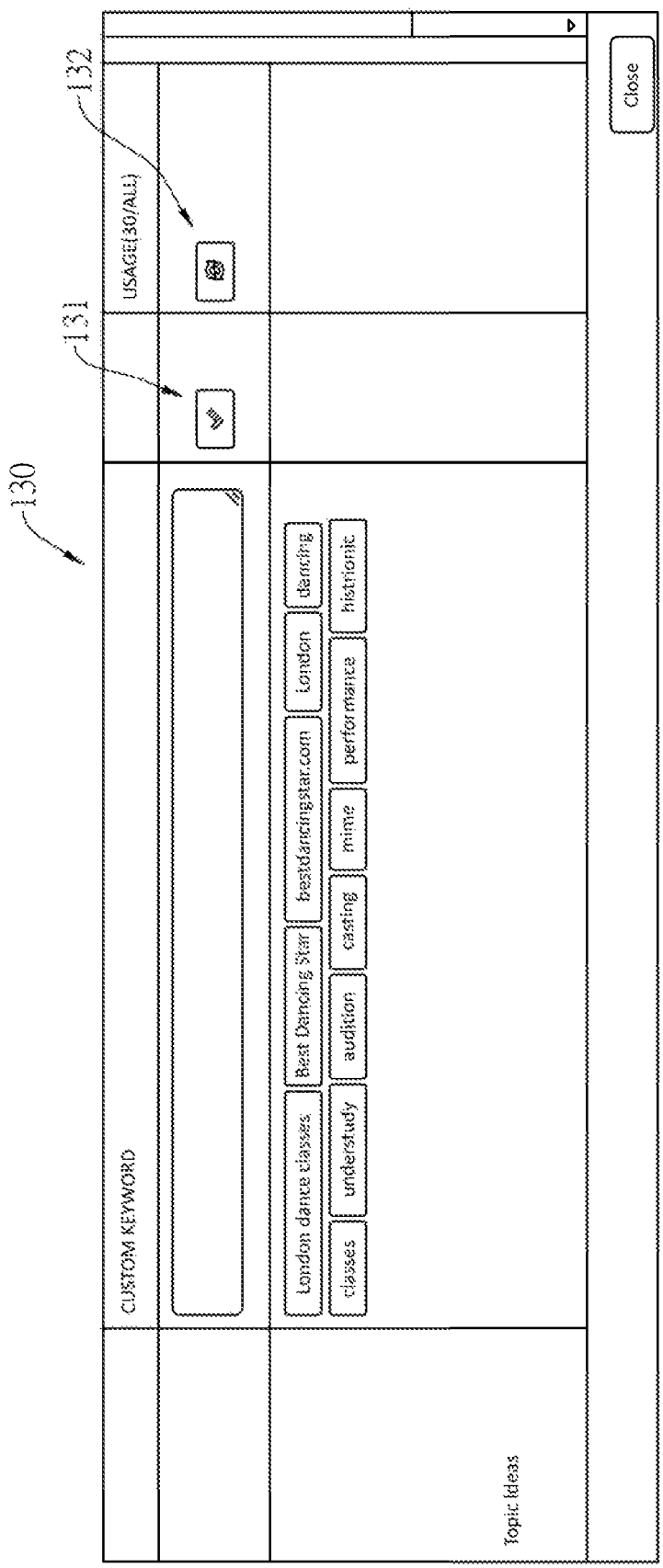
FIG. 13 is a perspective view of a keyword customization window of the website analyzing method of the present invention.

With reference to FIG. 13, FIG. 13 shows a keyword customization window 130. The keyword customization window 130 is generated by the processing module 10 and displayed through the display module 20. The keyword customization window 130 shows the variation keywords above the first word score threshold and yet to be used in the first time duration as available for selection. A confirm button 131 is shown available for confirming the generation of the customized keyword phrase from the many variation keywords. The customized keyword phrase is determined by the processing module 10 to be an optimized keyword. A refresh button 132 is also shown available for updating the variation keywords available to be chosen.

With reference to FIG. 14, FIG. 14 shows a project health status interface. The project health status interface is generated by the processing module 10 and displayed through the display module 20. The project health status interface displays several of the website project files stored in the memory module 30. Each of the website project files contains a website project along with a corresponding health score generated by the present invention. In the present embodiment, the Eye in the Sky unit 16 is an AI unit within the processing module 10. The Eye in the Sky unit 16 is responsible for generating and monitoring all the health scores for all the website projects.

For each of the website projects, the Eye in the Sky unit 16 generates the health score by gathering all available data relating to the keywords of the website project internally and externally from third party tools. Data relating to the website project, for instance, includes the first internal anchor type percentages, the first external anchor type percentages, the first default anchor type percentages, the second internal anchor type percentages, the second default anchor type percentages. The Eye in the Sky unit 16 also uses one of multiple scoring criteria stored in the memory module 30 for scoring the website project. After the Eye in the Sky unit 16 generates the health scores for all the website projects, for each of the website projects, the Eye in the Sky unit 16 periodically executes steps S37 to S39. When the Eye in the Sky unit 16 generates the email to notify the website modifier, the language AI is also incorporated for generating sentences, asking the website modifier to make specific changes the website project for raising the health score of the website project. The Eye in the Sky unit 16 also incorporates the language AI to generate similar sentences in a message window generated by the processing module 10 specifically dedicated for notifying the website modifier about healthiness or any arising problems relating to the website project.

In FIG. 14, one of the website projects has the health score greater than the first health score threshold, and therefore appears to be non-highlighted. The rest of the website projects each have the health score less than the first health score threshold, and are therefore highlighted. In the present embodiment, a second health score threshold is also imposed, to differentiate the severity of unhealthiness among the unhealthy two cases of website projects. Here in FIG. 14 the highlight is presented as dots. The website project expanded in FIG. 14 has the lowest health score, and therefore is the most highlighted website project in FIG. 14 with the highest density of dots. The website project expanded in FIG. 14 has a health score of negative 559 points. When expanded, the processing module 10 lists out detailed information about the contributing factors of such low health score; in other words, the low scoring keywords are listed out in detail.

Figure 15:
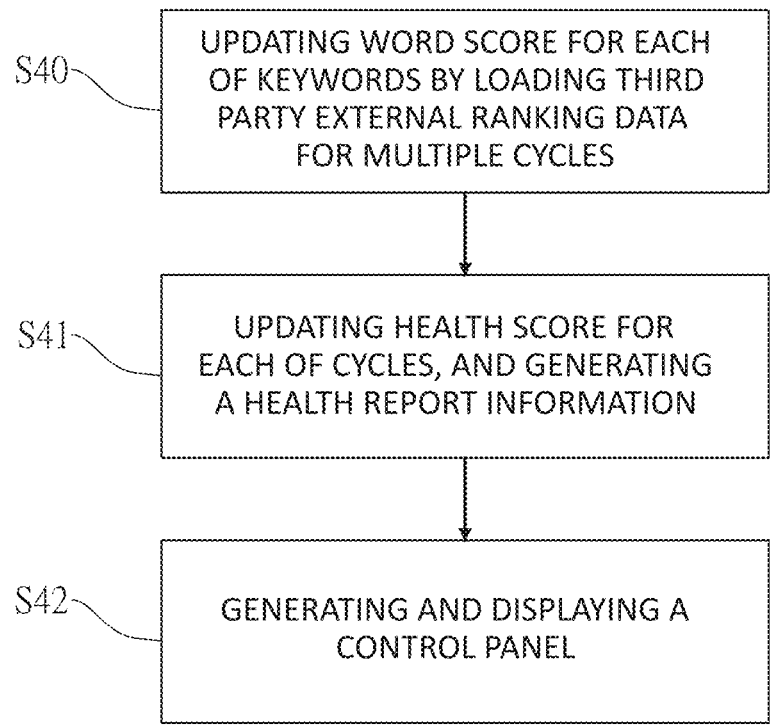
FIG. 15 is another flow chart for the website analyzing method of the present invention.

With reference to FIG. 15, the present invention includes the following steps:

Step S40: updating the word score for each of the keywords by loading the third party external ranking data of the website project for multiple cycles by the automation unit 18. Each of the cycles spans a finite amount of time.

Step S41: updating the health score for the website project for each of the cycles by the automation unit 18, and generating a health report information by the Eye in the Sky unit 16. The health report information comprises a healthy report generation time stamp generated by the Eye in the Sky unit 16, a list of the keywords used in the website project listed by the keyword unit 12, and the word score for each of the keywords generated by the language AI of the AI analysis unit 15, as shown in the expanded view of the lowest scoring website project in FIG. 14.

Step S42: generating and displaying a control panel. The control panel allows regulation to the overall aggressiveness of the selected strategy.

A trend predicting AI of the AI analysis unit 15 monitors the third party external ranking data for a rank of the website project. For each of the cycles initiated by the automation unit 18, the trend predicting AI generates a trend prediction information for the website project based on fluctuations of the rank of the website project according to the third party external ranking data. In FIG. 14, the trend prediction information is displayed on the project health status interface through the display module 20 as the trend predicting AI helps each of the website projects to predict trends for each of their different cycles. For the website project with the health score of negative 559 points, the trend predicting AI helps to predict trend in the $89^{th}$ cycle.

The overall aggressiveness of the selected strategy is reflected as different amounts of the first default anchor type percentages. Compared to selecting different optimizing strategies, here with the control panel the degree of aggressiveness of the selected strategy can be fine-tuned in a convenient manner.

Figure 16:
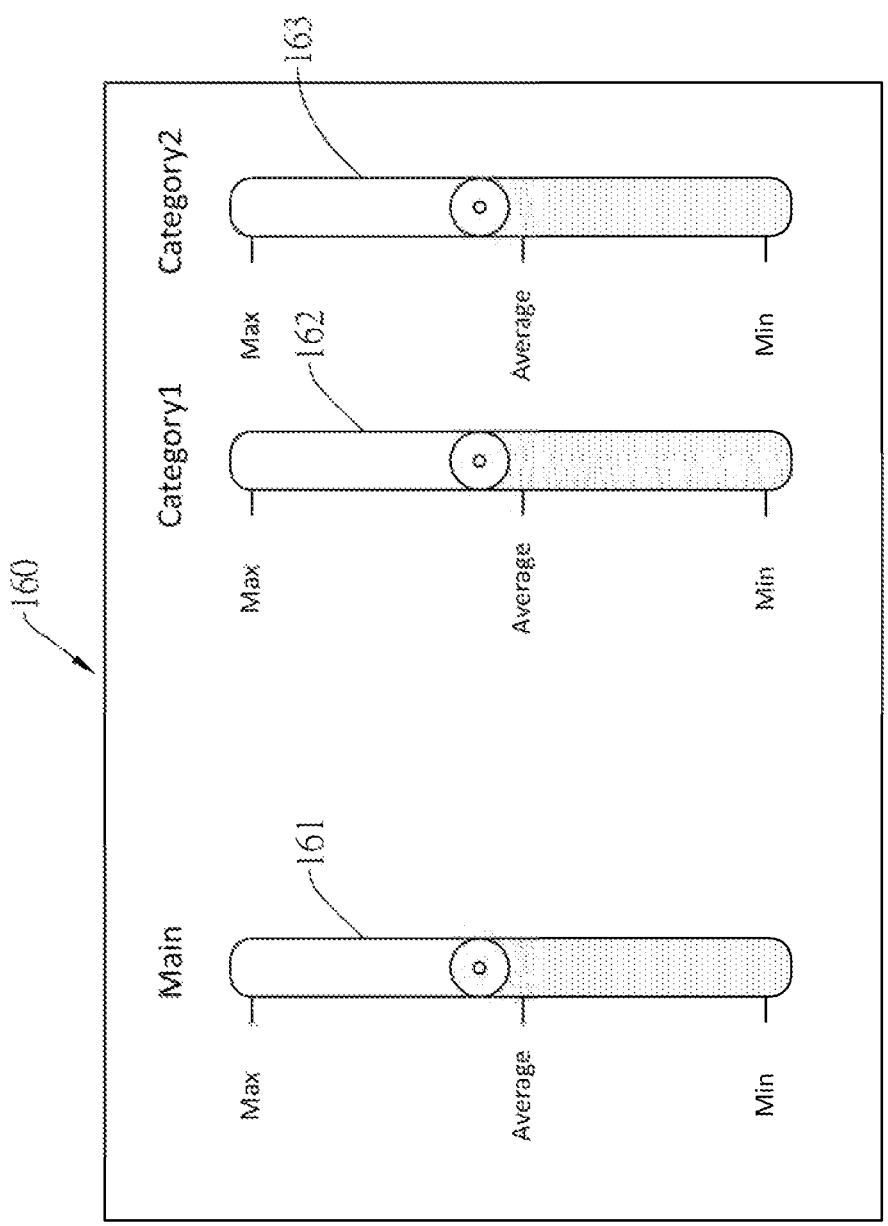
FIG. 16 is a perspective view of a control panel of the website analyzing method of the present invention.

With reference to FIG. 16, the control panel 160 is an interface generated by the dashboard unit 17 of the processing module 10 and displayed through the display module 20. The control panel 160 includes a master control bar 161 and multiple micro control bars for the user to control. The master control bar 161 controls the overall aggressiveness of the selected strategy, while the micro control bars control category-specific aggressiveness of the selected strategy adopted by the project unit 11 for the website project to remain white-hat. For instance, in an embodiment, a first micro control bar 162 regulates an amount of the first default anchor type percentages for the EMT anchor type, while a second micro control bar 163 regulates an amount of the second default anchor type percentages for the BRD anchor type. When the overall aggressiveness of the selected strategy is increased through the master control bar 161 of the control panel 160, both the first default anchor type percentages for the EMT anchor type and the second default anchor type percentages for the BRD anchor type are also increased by the control panel 160, and vice versa.

Furthermore, a competition analyzer AI of the AI analysis unit 15 monitors the third party external ranking data and the third party external keyword data of the website project. The competition analyzer AI generates competition information by comparing the keywords of the website project to multiple ranked URLs gathered by the rankings unit 14 from third party search engines. The competition information comprises a list of the ranked URLs and a category of competition for each of the ranked URLs in relation to the keywords of the website project, thus allowing the website modifier of the website project to understand a competitiveness in rankings of the website project. The competition analyzer AI is trained by 16 folds of neural network structure in a complicated fashion, allowing the competition analyzer AI to find competitors to the website project and to make complicated and accurate analyzation on the competitors. This way the website modifier is presented with great amount of information to navigate around the competitors of the website project, and to more successfully increase rankings of the website project.

In another embodiment, the control panel 160 is generated as in Table 1 below, wherein the control panel 160 allows regulation to the overall aggressiveness of the selected strategy by allowing partial modification of the first default anchor type percentages and the second default anchor type percentages of the multiple anchor types of the selected strategy.

default anchor type percentages across the different anchor types equals 100%. The total sum of percentages is represented as T % in Table 1. These percentage adjustments will reflect on the overall aggressiveness of the selected strategy as well as detailed approach towards modifying the website project. Percentages in bold font are kept from modifications, as the present invention still imposes some unchangeable boundaries from over-modifying the website project.

In another embodiment, the control panel 160 is generated as in Table 2 below.

TABLE 2

|  | BRAND | EMT | BASE | REL | VAR | BVAR | DVAR | MISC | NURL | CUST | T % |
|---|---|---|---|---|---|---|---|---|---|---|---|
| MIX | 35 | 0 | 5 | 5 | 3 | 1 | 1 | 10 | 10 | 30 | 100 |
| ART | 0 | 0 | 0 | 0 | 0 | 0 | 0 | 0 | 0 | 0 | 0 |

Here in Table 2, the first default anchor type percentages belong to the Mixed link type, represented as MIX in Table 1, and the second default anchor type percentages belong to the Article Topics link type, represented as ART in Table 1. The first default anchor type percentages are free to be adjusted across all of the anchor types, yet for the second default anchor type percentages, only the second default anchor type percentage for the custom anchor type is free for adjustment. The custom anchor type is represented as CUST as previously mentioned. In this embodiment, the total sum of percentages also accepts 0% as an answer. If the total sum of percentages is 0%, as in the case for the Article Topics link type, the present invention then omits considering the second default anchor type percentages. Regarding Table 1 and Table 2, embodiments of the present invention offer many variations to the control panel 160 generated and the anchor types and the link types considered. In other words, the control panel 160 is free to be elsewise in another embodiment of the present invention.

Furthermore, the present invention allows the website modifier to choose one of the link types considered by the selected strategy for the website project. Once the link type is chosen, the processing module 10 uses the competition analyzer AI to generate an external anchor needed percentage, an internal anchor needed percentage, and a link type anchor percentage needed for the selected link type across all of the anchor types the competition analyzer AI considers for the website project under the selected strategy.

For example, if the selected strategy for the website project considers two link types, one is the Commenting link type corresponding to the first default anchor type percentages, one is the Citations link type corresponding to the

TABLE 1

|  | BRAND | EMT | BASE | REL | VAR | BVAR | DVAR | MISC | NURL | CUST | T % |
|---|---|---|---|---|---|---|---|---|---|---|---|
| CMT | 70 | 0 | 0 | 0 | 0 | 0 | 0 | 0 | 10 | 20 | 100 |
| CIT | 0 | 0 | 20 | 0 | 0 | 0 | 0 | 0 | 0 | 80 | 100 |

In Table 1, the first default anchor type percentages belong to the Commenting link type, represented as CMT in Table 1, and the second default anchor type percentages belong to the Citations link type, represented as CIT in Table 1. The control panel 160 allows adjustments of the first default anchor type percentages and the second default anchor type percentages for numbers appearing without bold font in Table 1. These percentages may be freely adjusted as long as in the end of adjustment, a total sum of all the first second default anchor type percentages, and if the Citations link type is chosen by the website modifier, the processing module 10 then loads the second default anchor type percentages across all of the anchor types with greater than zero percent values for the competition analyzer AI. According to the example in Table 1, the processing module 10 would then load BASE 20% and CUST 80% for the competition analyzer AI.

The external anchor needed percentage, the internal anchor needed percentage, and the link type anchor percentage generated by the competition analyzer AI are different from the second default anchor type percentages. The internal anchor needed percentage corresponds to an amount of particular keywords needed in the website project divided by the word sum of the website project. The particular keywords needed not only belongs to Citations link type, but also are respectively of either the BASE or CUST anchor type and are internal anchors that link to webpages within the website project. Similarly, the external anchor needed percentage corresponds the keywords needed not only belongs to Citations link type, but also are respectively of either the BASE or CUST anchor type and are external anchors that link outside the website project. The link type anchor percentage is different from the second default anchor type percentages because the second default anchor type percentages add up to 100%, while the link type anchor percentages across both BASE and CUST anchor types should add up to less than 100% when the website project also needs keywords of the Commenting link type. In other words, the link type anchor percentage corresponds the keywords needed not only belongs to Citations link type, but also are respectively of either the BASE or CUST anchor type with regards to all of the keywords needed for the website project.

Furthermore, the present invention stores multiple sets in the memory module 30. Each of the sets includes a link-building information. The link-building information of each of the sets stored in the memory module 30 may be edited. In this embodiment, the memory module 30 stores a first set, a second set, and a third set. The link-building information of the first set, for example, requires the website project to have a total of ten links, wherein five of the ten links should be of the Directory link type, two of the ten links should be of the Citations link type, and three of the ten links should be of the video link type. The link-building information of the first set also notes a speed of which links should be build, for instance, two links should be built per day until reaching the total of ten links in the website project. Since the first set includes the link-building information requiring the website project to build links with a combination of the Directory link type, the Citations link type, and the video link type, the processing module 10 corresponds the first set with the combination of the Directory link type, the Citations link type, and the video link type.

The processing module 10 further uses the competition analyzer AI to generate a first list of recommended link types based on a first link usage of the website project. The first link usage of the website project is traffic of the website project recorded by the processing module 10 over a period of time through connecting to the Internet. The first link usage refers to records of anchor texts linking to the website project. Through the communications module 40, the processing module 10 also gathers a second link usage of the website project from a third party tool. The processing module 10 also uses the competition analyzer AI to generate a second list of recommended link types based on the second link usage of the website project provided by the third party tool. The processing module 10 then matches the first and the second lists of recommended link types to the sets stored in the memory module 30.

TABLE 3

|  | Ext. anchor needed % | Int. anchor needed % | Rec. by link usage | Rec. sets by link usage | Rec. by in/ex usage | Rec. sets by in/ex usage |
| --- | --- | --- | --- | --- | --- | --- |
| BASE | 58 | 24 | Maps, Commenting | Second set, Third set | Maps | Second set |
| CUST | 6 | 11 | Photo/Video/ Infographic Sharing, Directory, Citations | First set | Photo/Video/ Infographic Sharing, Directory, Citations | First set |

According to Table 3, the external anchor needed percentages are respectively 58% for the BASE anchor type and 6% for the CUST anchor type, and the internal anchor needed percentages are respectively 24% for the BASE anchor type and 11% for the CUST anchor type. The first list of recommended link types for the BASE anchor type is the Maps link type and the Commenting link type. The second list of recommended link types for the BASE anchor type is the Maps link type. Since the Maps link type corresponds to the second set, the second set is recommended for both the first and the second list of recommended link types for the BASE anchor type. Since the Commenting link type corresponds to the third set, the third set is recommended for the first list of recommended link types for the BASE anchor type.

Similarly, since the combination of the Directory link type, the Citations link type, and the Photo/Video/Infographic Sharing link type corresponds to the first set, the first set is recommended for both the first and the second list of recommended link types for the CUST anchor type.

Furthermore, the processing module 10 counts all of the sets appeared in all of the lists of recommended link types, and determines which of the sets is most frequently recommended. Regarding the example in Table 3, both the first set and the second set are most frequently recommended as the first set is counted twice, the second set is counted twice, and the third set is only counted once by the processing module 10. The processing module 10 then presents the most frequently recommended at least one set to the website modifier, allowing the website modifier to build the website project in accordance to the most frequently recommended at least one set.

The processing module 10 also additionally counts how many times each of the sets of all of the sets appeared in all of the lists has been used. The processing module 10 displays this information to the website modifier so that the website modifier understands which of the sets is lacking in the website project, hence which of the sets needs to be used to build the website project.

Figure 17:
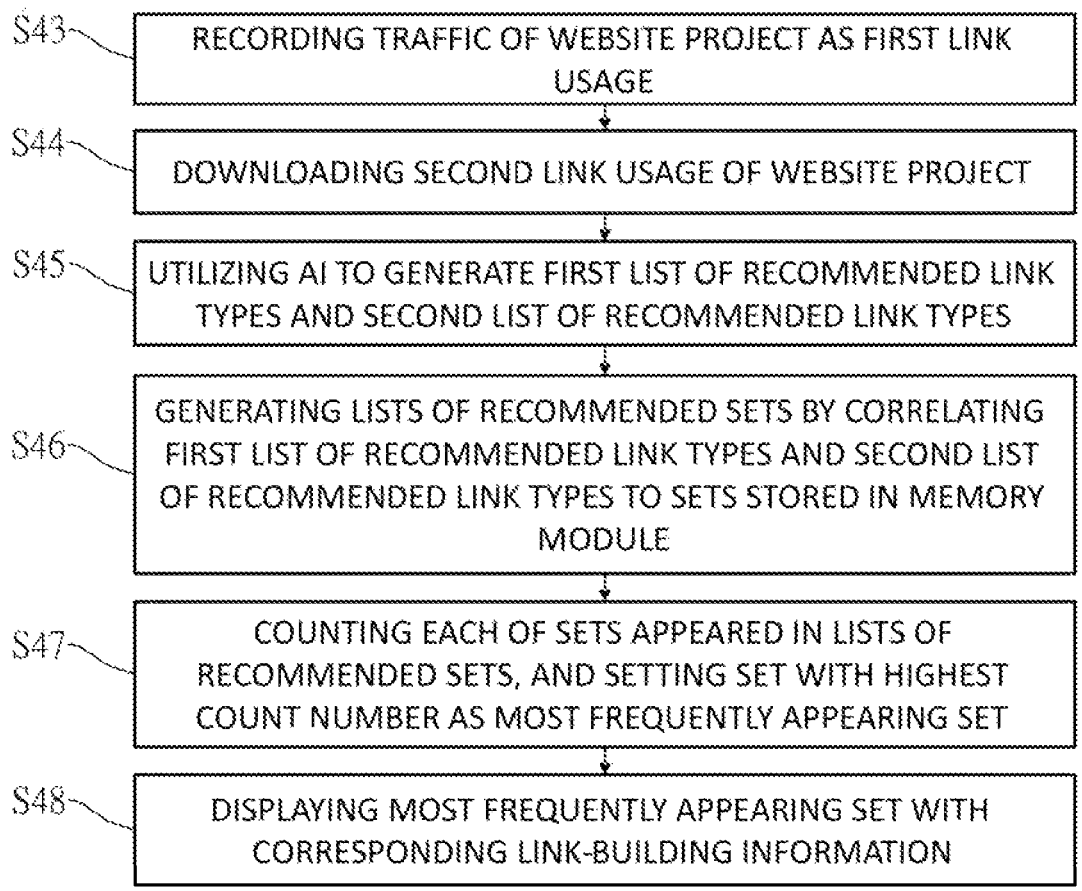
FIG. 17 is another flow chart for the website analyzing method of the present invention.

With reference to FIG. 17, regarding the actions described above, the present invention further includes the following steps:

Step S43: recording traffic of the website project as a first link usage of the website project from links to the website project recorded by the project unit 11 via the communications module 20.

Step S44: downloading another recording of traffic of the website project from the third party tool as a second link usage of the website project from the Internet through the project unit 11 via the communications module 20.

Step S45: utilizing the competition analyzer AI of the AI analysis unit 15 to generate the first list of recommended link types based on the first link usage of the website project and the second list of recommended link types based on the second link usage of the website project through the anchor text unit 13.

Step S46: generating lists of recommended sets through the anchor text unit 13 by correlating the first list of recommended link types and the second list of recommended link types to sets stored in the memory module 30.

Step S47: counting each of the sets appeared in the lists of recommended sets, and setting the set with the highest count number as the most frequently appearing set.

Step S48: displaying the most frequently appearing set with the corresponding link-building information on a table generated by the dashboard unit 17 through the display module 20.

By executing steps S43 to S48, the present invention is able to show the website modifier the link-building information of a correct set to build the website project on.

The present invention tracks usage of the keywords of the website project with the internal anchor type percentages and the external anchor type percentages across different anchor types. The present invention further tracks different link types of the keywords in terms of the second internal anchor type percentages. Apart from tracking usage of the keywords, the present invention imposes boundaries such as the default anchor type percentages and the second default anchor type percentages across different anchor and link types. This way the present invention prevents over-modifications of the keywords, and thus prevents risks of the website project from being blacklisted as using black hat SEO tactics. The present invention provides a better SEO tool for maintaining the website project's rank and popularity.

With reference to FIG. 1, to summarize the present invention, the software units executed by the processing module 10 working in combination for keeping the website project remaining white-hat can be described as the below.

The project unit 11 accesses the website project stored in the memory module 30 and gathers information related to the website project from the Internet through the communications module 40.

The keyword unit 12, based on the selected keyword related to the website project, gathers records relating to the selected keyword from the Internet.

The anchor text unit 13 gathers the traffic resulting from links to the website project from the Internet. The traffic comprises a record of an anchor text linking to the website project.

The rankings unit 14 gathers the keyword ranking data relating to the selected keyword from the Internet.

The AI analysis unit 15 generates the trend prediction information for the website project based on the keyword ranking data.

The Eye in the Sky unit 16 gathers the keyword ranking data and all the available data relating to multiple keywords of the website project internally from the memory module and externally from the Internet through the communications module 40 for generating the health score for the website project. When the Eye in the Sky unit 16 determines that the health score falls under the health score threshold, the Eye in the Sky unit 16 generates the warning information.

The dashboard unit 17 generates a User Interface (UI), such as the project health status interface, and controls the display module to display the health score of the website project through UI.

The automation unit 18 obtains the variation keywords relating to the selected keyword from the Internet and determines the optimized keyword from the variation keywords for the website project to remain white-hat.

What is claimed is:

1. A website analyzing method, executed by a processing module of an operating system, automatically analyzing a website project in regards to a selected strategy towards a search engine optimization (SEO) tactic;
   wherein the processing module of the operating system is connected to a memory module, a communications module, and a display module; the memory module stores the website project, the communications module is connected to Internet, and the processing module runs multiple software units that execute the website analyzing method by working in combination for keeping the website project remaining white-hat;
   wherein the website analyzing method comprises steps of:
   loading the website project through a project unit; wherein the project unit is one of the software units that accesses the website project stored in the memory module and gathering information related to the website project from the Internet through the communications module; wherein the website project comprises multiple keywords, and each of the keywords belongs to one of multiple anchor types;
   counting a word count of the keywords of the website project through a keyword unit for obtaining a word sum of the website project; wherein the keyword unit is one of the software units that gathers records relating to the keywords of the website project internally by calculating the word sum and externally through the Internet;
   respectively counting a first anchor word count for each of the anchor types through an anchor text unit to obtain a first anchor word sum for each of the anchor types; wherein the anchor text unit is one of the software units that gathers statistics of the anchor types internally by calculating the first anchor word sums and externally by obtaining traffic results of links to the website project from the Internet;
   respectively dividing each of the first anchor word sums of each of the anchor types calculated through the anchor text unit by the word sum calculated through the keyword unit to obtain multiple first internal anchor type percentages of the multiple anchor types; wherein each of the first internal anchor type percentages corresponds to one of the anchor types;
   based on the selected strategy, loading multiple first default anchor type percentages through the project unit as over-modification thresholds towards the first internal anchor type percentages; wherein each of the first default anchor type percentages corresponds to one of the multiple anchor types and the selected strategy;
   for each of the anchor types, comparing the first internal anchor type percentages to the first default anchor type percentages through an Eye in the Sky unit, and when the first internal anchor type percentage is greater than or equal to the first default anchor type percentage, marking the first internal anchor type percentage as being over-modified in regard to the selected strategy through the Eye in the Sky unit; wherein the Eye in the Sky unit is one of the software units that monitors the website project to remain white-hat;

generating a first internal warning information corresponding to the marked first internal anchor type percentage through the Eye in the Sky unit; and displaying the first internal anchor type percentages of the multiple anchor types, the first default anchor type percentages of the multiple anchor types, and the first internal warning information by having a dashboard unit to generate an internal anchor percentage comparison interface and displaying the internal anchor percentage comparison interface through the display module for warning over-modification of the keywords of the website project in regard to the selected strategy; wherein the dashboard unit is one of the software units that generates the internal anchor percentage comparison interface for numerically detailing the over-modification of the keywords.

2. The website analyzing method as claimed in claim 1, wherein while some of the keywords belong to a first link type, some of the other keywords belong to a second link type;

wherein the multiple first internal anchor type percentages and the multiple first default anchor type percentages of the multiple anchor types all correspond to the keywords that belong to the first link type;

wherein the processing module also determines whether the website project over-modifies the keywords that belong to the second link type through executing the following steps:

respectively counting a second anchor word count for each of the anchor types that correspond to the second link type through the anchor text unit to obtain a second anchor word sum for each of the anchor types;

respectively dividing each of the second anchor word sums of each of the anchor types calculated through the anchor text unit by the word sum calculated through the keyword unit to obtain multiple second internal anchor type percentages of the multiple anchor types: wherein each of the second internal anchor type percentages corresponds to one of the anchor types;

loading multiple second default anchor type percentages through the project unit as over-modification thresholds towards the second internal anchor type percentages; wherein each of the second default anchor type percentages corresponds to one of the multiple anchor types, the selected strategy and the second link type;

for each of the anchor types, comparing the second internal anchor type percentages to the second default anchor type percentages through the Eye in the Sky unit, and when the second internal anchor type percentage is greater than or equal to the second default anchor type percentage, marking the second internal anchor type percentage as being over-modified in regard to the selected strategy through the Eye in the Sky unit; and generating a second internal warning information corresponding to the marked second internal anchor type percentage through the Eye in the Sky unit; and displaying the second internal warning information through the internal anchor percentage comparison interface generated by the dashboard unit that is further displayed through the display module, thus detailing the over-modification of the keywords that belong to the second link type.

3. The website analyzing method as claimed in claim 2, further comprising steps of:

loading third party external keyword data from the Internet through the keyword unit and the anchor text unit via the communications module; wherein the third party external keyword data comprises same keywords as the keywords of the website project, and the third party external keyword data comprises multiple first external anchor type percentages of the multiple anchor types;

for each of the anchor types, comparing the first external anchor type percentages to the first default anchor type percentages through the Eye in the Sky unit, and when the first external anchor type percentage is greater than or equal to the first default anchor type percentage, marking the first external anchor type percentage as being over-modified in regard to the selected strategy through the Eye in the Sky unit;

generating a first external warning information corresponding to the marked first external anchor type percentage through the Eye in the Sky unit; and displaying the first external anchor type percentages of the multiple anchor types, the first default anchor type percentages of the multiple anchor types, and the first external warning information by having the dashboard unit to generate an external anchor percentage comparison interface and displaying the external anchor percentage comparison interface through the display module for warning the over-modification of the anchor types of the keywords of the website project in regard to the selected strategy and the third party external keyword data.

4. The website analyzing method as claimed in claim 1, wherein when obtaining the first internal anchor type percentages, a time stamp is generated for each of the keywords by the keyword unit using a current time information of the operating system: wherein the website analyzing method further comprises steps of:

respectively counting a repetition word count for each of the keywords corresponding to each of the anchor types through the keyword unit in order to obtain a repetition count of each of the keywords corresponding to each of the anchor types;

respectively dividing the repetition count of each of the keywords corresponding to each of the anchor types by the word sum to obtain a first internal keyword percentage for each of the keywords corresponding to each of the anchor types through the keyword unit; wherein each of the first internal keyword percentages corresponds to one of the anchor types;

generating a keyword list of the keywords in the website project through the keyword unit; wherein the keyword list comprises the keywords, an anchor type of each of the keywords, the first internal keyword percentages, the time stamp of each of the keywords, and the repetition count of each of the keywords within the website project;

displaying the keyword list through the display module for listing out the keywords, the anchor type of each of the keywords, a visualization of the first internal keyword percentages, the time stamp of each of the keywords, and the repetition count of each of the keywords within the website project for providing analytic information related to the keywords.

5. The website analyzing method as claimed in claim 4, further comprising:
- based on the time stamp of each of the keywords and the current time information, counting a first word count of the keywords used within a first time duration to generate a first count data through the keyword unit; and
- displaying the first count data by having the dashboard unit generate a keyword usage interface and displaying the keyword usage interface through the display module.

6. The website analyzing method as claimed in claim 5, further comprising steps of:
- conducting a second word count of the keywords used within a second time duration to generate a second count data through the keyword unit; and
- displaying the second count data on the keyword usage interface; wherein the keyword usage interface includes different time durations that correspond to different count data;
- wherein the first time duration is shorter than the second time duration.

7. The website analyzing method as claimed in claim 2, further comprising steps of:
- loading third party external ranking data from the Internet through a rankings unit via the communications module; wherein the rankings unit is one of the software units that gather records of ranking data from third party search engines on the Internet via the communications module; wherein the third party external ranking data comprises at least one ranked Uniform Resource Locator (URL), a ranking third party search engine information, a time stamp for each of the at least one URL, and a rank change information for each of the at least one URL;
- generating a rankings graph in chronological order according to the rank change information through the rankings unit;
- displaying the third party external ranking data and the rankings graph by the dashboard unit through the display module for showcasing the rank change information of the at least one URL.

8. The website analyzing method as claimed in claim 3, further comprising steps of:
- when the first internal anchor type percentage is greater than or equal to the first default anchor type percentage, further determining whether the first internal anchor type percentage is greater than the first default anchor type percentage;
- when the first internal anchor type percentage is greater than the first default anchor type percentage, highlighting the first internal anchor type percentage in the internal anchor percentage comparison interface through the Eye in the Sky unit, signifying that the first internal anchor type percentage is considered being over-modified to remain white-hat in regard to the selected strategy;
- when the first external anchor type percentage is greater than or equal to the first default anchor type percentage, further determining whether the first external anchor type percentage is greater than the first default anchor type percentage;
- when the first external anchor type percentage is greater than the first default anchor type percentage, highlighting the first external anchor type percentage in the external anchor percentage comparison interface through the Eye in the Sky unit, signifying that the first external anchor type percentage is considered being over-modified to remain white-hat in regard to the selected strategy.

9. The website analyzing method as claimed in claim 8, further comprising steps of:
- for each of the anchor types, determining whether both the first internal anchor type percentage and the first external anchor type percentage are yet to be highlighted;
- when both the first internal anchor type percentage and the first external anchor type percentage are yet to be highlighted, generating a safe information corresponding to the anchor type through the Eye in the Sky unit;
- based on the safe information, generating a safe-to-edit anchor type list comprising the anchor types corresponding to the safe information through the Eye in the Sky unit, for listing out anchor types safe to be further modified while remaining white-hat.

10. The website analyzing method as claimed in claim 3, further comprising steps of:
- loading third party external keyword ranking data through a rankings unit; wherein the rankings unit is one of the software units that gather records of ranking data from third party search engines on the Internet via the communications module; wherein the external keyword ranking data has keyword rank change information corresponding to the third party external keyword data;
- displaying the external keyword ranking data along with the third party external keyword data by the dashboard unit through the display module for showing how the keywords of the website project are ranked.

11. The website analyzing method as claimed in claim 6, further comprising steps of:
- categorizing each of the keywords into one of multiple word categories through an AI analysis unit; wherein the AI analysis unit is one of the software units, and the categorizing is aided by a language artificial intelligence (AI) trained for processing natural languages and phrases of the AI analysis unit;
- displaying the keywords and the word categories by having the dashboard unit generate a keyword mapping interface and displaying the keyword mapping interface through the display module;
- wherein the first internal warning information is displayed by the dashboard unit in sentences formulated by the language AI for recommending to omit further editing the anchor type corresponding to the first internal warning information.

12. The website analyzing method as claimed in claim 11, further comprising steps of:
- based on a selected keyword out of the keywords that are displayed on a keyword selection interface generated by the dashboard unit and displayed through the display module, loading multiple variation keywords relating to the selected keyword from a third party tool through the communications module;
- counting first times of each of the variation keywords used within the first time duration through the keyword unit, and second times of each of the variation keywords used in the website project through the keyword unit;
- for each of the variation keywords, counting a variation word count for the number of times of each of the variation keywords appearing in the website project through the keyword unit;

calculating a variation word percentage as the variation word count divided by the word sum through the keyword unit;

displaying each of the variation keywords, the anchor types of each of the variation keywords, the variation word percentage of each of the variation keywords, the first times of each of the variation keywords used within the first time duration, and the second times of each of the variation keywords used in the website project by having the dashboard unit generate a variation keyword interface and displaying the variation keyword interface through the display module, thus allowing usages of the variation keywords to be tracked overtime.

13. The website analyzing method as claimed in claim 12, wherein for each of the variation keywords, the language AI of the AI analysis unit further creates a word score based on popularity of each of the variation keywords;

wherein the higher the word score is, the better rank the variation keyword has, and vice versa;

wherein when the word score for any of the variation keywords is determined by the Eye in the Sky unit to be lower than a first word score threshold, a warning information is generated by the language AI of the AI analysis unit;

wherein when displaying the variation keywords in the variation keyword interface that is generated by the dashboard unit, the word score of each of the variation keywords and the warning information are further displayed in the variation keyword interface through the display module, showing an assessment of the variation keywords.

14. The website analyzing method as claimed in claim 13, further comprising steps of:

generating a keyword customization window by the dashboard unit; wherein the keyword customization window displays the variation keywords above the first word score threshold and is yet to be used in the first time duration through the display module;

after at least one of the variation keywords is selected through the keyword customization window that is generated by the dashboard unit, generating a customized keyword phrase as an optimized keyword considered by an automation unit, allowing the customized keyword phrase to be used for further editing the website project while the website project remains white-hat; wherein the automation unit is one of the software units that ensures optimal keywords are used in the website project for the website project to remain white-hat.

15. The website analyzing method as claimed in claim 13, further comprising steps of:

loading third party external ranking data of the website project from the Internet through a rankings unit via the communications module; wherein the rankings unit is one of the software units that gather records of ranking data from third party search engines on the Internet via the communications module;

generating a health score for the website project as a sum of the word scores of the keywords by the Eye in the Sky unit;

determining whether the health score is less than a first health score threshold by the Eye in the Sky unit;

when the health score is determined to be less than the first health score threshold by the Eye in the Sky unit, the website project is highlighted to be unhealthy on a project health status interface that is generated by the dashboard unit and displayed through the display module, allowing a healthiness of the website project to remain white-hat to be clearly perceived via the display module.

16. The website analyzing method as claimed in claim 15, further comprising steps of:

generating an email for the website project considered to be unhealthy through the Eye in the Sky unit and the language AI of the AI analysis unit; wherein the email lists out the keywords with the lowest word score contributing to unhealthiness of the website project; wherein the email is sent via the Internet through the communications module to notify a website modifier of the website project.

17. The website analyzing method as claimed in claim 15, further comprising steps of:

updating the word score for each of the keywords by loading the third party external ranking data of the website project for multiple cycles by an automation unit; wherein each of the cycles spans a finite amount of time; wherein the automation unit is one of the software units;

updating the health score for the website project for each of the cycles by the automation unit, and generating a health report information by the Eye in the Sky unit;

wherein the health report information comprises a healthy report generation time stamp generated by the Eye in the Sky unit, a list of the keywords used in the website project listed by the keyword unit, and the word score for each of the keywords generated by the language AI of the AI analysis unit.

18. The website analyzing method as claimed in claim 17, wherein a trend predicting AI of the AI analysis unit monitors the third party external ranking data for a rank of the website project;

wherein for each of the cycles initiated by the automation unit, the trend predicting AI generates a trend prediction information for the website project based on fluctuations of the rank of the website project according to the third party external ranking data; wherein the trend prediction information is displayed on the project health status interface through the display module.

19. The website analyzing method as claimed in claim 17, wherein a competition analyzer AI of the AI analysis unit monitors the third party external ranking data and the third party external keyword data of the website project;

wherein the competition analyzer AI of the AI analysis unit generates competition information by comparing the keywords of the website project to multiple ranked Uniform Resource Locators (URLs) gathered by the rankings unit from the third party search engines: the competition information comprises a list of the ranked URLs and a category of competition for each of the ranked URLs in relations to the keywords of the website project, thus allowing a website modifier of the website project to understand a competitiveness in rankings of the website project.

20. The website analyzing method as claimed in claim 18, further comprising steps of:

generating a control panel by the dashboard unit and displaying the control panel through the display module; wherein the control panel allows regulation to an overall aggressiveness of the selected strategy adopted by the project unit for the website project to remain white-hat; the overall aggressiveness of the selected strategy is reflected as different amounts of the first default anchor type percentages adopted by the project unit for the website project;

wherein when the overall aggressiveness of the selected strategy is increased through the control panel, the first default anchor type percentages are also increased by the control panel, and vice versa.

21. The website analyzing method as claimed in claim 19, further comprising steps of:

recording traffic of the website project as a first link usage of the website project from links to the website project recorded by the project unit via the communications module;

downloading another recording of traffic of the website project from the third party tool as a second link usage of the website project from the Internet through the project unit via the communications module;

utilizing the competition analyzer AI of the AI analysis unit to generate a first list of recommended link types based on the first link usage of the website project and a second list of recommended link types based on the second link usage of the website project through the anchor text unit;

generating lists of recommended sets through the anchor text unit by correlating the first list of recommended link types and the second list of recommended link types to sets stored in a memory module; wherein each of the sets includes a link-building information;

displaying the most frequently appearing set with the corresponding link-building information through a table generated by the dashboard unit, and displaying the table through the display module.

* * * * *